US012172776B2

(12) United States Patent
Wake et al.

(10) Patent No.: US 12,172,776 B2
(45) Date of Patent: Dec. 24, 2024

(54) DRONE SYSTEM, DRONE, MOVABLE BODY, DRONE SYSTEM CONTROL METHOD, AND DRONE SYSTEM CONTROL PROGRAM

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 612 days.

(21) Appl. No.: 17/299,033

(22) PCT Filed: Dec. 2, 2019

(86) PCT No.: PCT/JP2019/047036
§ 371 (c)(1),
(2) Date: Jun. 2, 2021

(87) PCT Pub. No.: WO2020/116392
PCT Pub. Date: Jun. 11, 2020

(65) Prior Publication Data
US 2022/0024580 A1 Jan. 27, 2022

(30) Foreign Application Priority Data
Dec. 5, 2018 (JP) ................................. 2018-227850

(51) Int. Cl.
*B64U 70/93* (2023.01)
*B64U 10/14* (2023.01)
(Continued)

(52) U.S. Cl.
CPC ............. *B64U 70/93* (2023.01); *B64U 10/14* (2023.01); *B64U 10/16* (2023.01); *B64U 30/20* (2023.01);
(Continued)

(58) Field of Classification Search
CPC ........ B64U 70/93; B64U 10/14; B64U 80/86; B64U 2101/40; B64U 2101/45;
(Continued)

(56) References Cited

U.S. PATENT DOCUMENTS 9,056,676 B1 * 6/2015 Wang ..................... B64F 1/222
9,481,475 B2 * 11/2016 Campillo ................. B64F 1/10
(Continued)

FOREIGN PATENT DOCUMENTS

| CN | 105517664 A | 4/2016 |
|---|---|---|
| JP | 2001-120151 A | 5/2001 |

(Continued)

OTHER PUBLICATIONS

International Search Report of PCT/JP2019/047036 dated Jan. 7, 2020.
(Continued)

*Primary Examiner* — Ig T An
*Assistant Examiner* — Christine Nguyen Huynh
(74) *Attorney, Agent, or Firm* — MATTINGLY & MALUR, PC

(57) ABSTRACT

A drone system that includes a drone and a movable body which is movable with loading the drone and where the drone can take off and land, cooperate to operate and that is able to maintain a high level of safety even during autonomous flight, is provided. The drone has a flight controller controlling a flight of the drone, and a drone transmitter transmitting an information possible to distinguish whether the drone is in flight. The movable body has a take-off and landing area where the drone is loaded, takes off and lands, a movement controller loading the drone on the take-off and landing area and moving the movable body with the drone, a movable body receiver receiving an information from the drone, and a display unit.

21 Claims, 28 Drawing Sheets

(51) Int. Cl.
*B64U 10/16* (2023.01)
*B64U 30/20* (2023.01)
*B64U 50/19* (2023.01)
*B64U 70/92* (2023.01)
*B64U 80/86* (2023.01)
*G05D 1/00* (2024.01)
*G08G 5/00* (2006.01)
*G08G 5/04* (2006.01)
*B64U 101/30* (2023.01)
*B64U 101/40* (2023.01)
*B64U 101/45* (2023.01)

(52) U.S. Cl.
CPC .............. *B64U 50/19* (2023.01); *B64U 70/92* (2023.01); *B64U 80/86* (2023.01); *G05D 1/0038* (2013.01); *G05D 1/106* (2019.05); *G08G 5/0013* (2013.01); *G08G 5/045* (2013.01); *B64U 2101/30* (2023.01); *B64U 2101/40* (2023.01); *B64U 2101/45* (2023.01); *B64U 2201/10* (2023.01); *B64U 2201/20* (2023.01)

(58) Field of Classification Search
CPC ............ B64U 2201/10; B64U 2201/20; B64U 50/14; B64U 50/19; B64U 2101/60; B64U 2201/104; B64U 10/13; B64U 30/20; B64U 70/00; B64D 1/18; B64C 39/024; G05D 1/0038; G05D 1/106; G05D 1/102; G08G 5/0013; G08G 5/045; G08G 5/0052; G08G 5/0069
See application file for complete search history.

(56) References Cited

U.S. PATENT DOCUMENTS

| | | | |
|---|---|---|---|
| 9,792,576 B1* | 10/2017 | Jamjoom | ........... G06Q 10/0832 |
| 9,817,405 B2 | 11/2017 | Li | |
| 10,571,930 B2* | 2/2020 | Coleman | .................. B60P 3/11 |
| 2016/0196756 A1* | 7/2016 | Prakash | ................. B64U 70/95 |
| | | | 701/3 |
| 2017/0031355 A1 | 2/2017 | Jung et al. | |
| 2018/0286252 A1 | 10/2018 | Park | |

FOREIGN PATENT DOCUMENTS

| | | |
|---|---|---|
| JP | 2017-013653 A | 1/2017 |
| JP | 2017-090115 A | 5/2017 |
| JP | 2017-100602 A | 6/2017 |
| JP | 2017-517425 A | 6/2017 |
| JP | 2017-163265 A | 9/2017 |
| JP | 2017-217942 A | 12/2017 |
| JP | 2019-104491 A | 6/2019 |
| WO | 2015180180 A1 | 12/2015 |

OTHER PUBLICATIONS

Chinese Office Action received in corresponding Chinese Application No. 201980079053.8 dated Jun. 15, 2023.

Japanese Office Action received in corresponding Japanese Application No. 2020-559180 dated Jun. 14, 2022.

* cited by examiner (a)

(b)

DRONE SYSTEM, DRONE, MOVABLE BODY, DRONE SYSTEM CONTROL METHOD, AND DRONE SYSTEM CONTROL PROGRAM

TECHNICAL FIELD

The present invention relates to a drone system, a drone, a movable body, a drone system control method, and a drone system control program.

BACKGROUND ART

An application of small helicopters (multi-copters) generally called drones is in progress. One of the important fields of application thereof is spraying of chemicals such as pesticides or liquid fertilizers to a farmland (a farm field) (for example, Patent Literature 1). In relatively small farmlands, drones are more suitable than manned airplanes and helicopters in many cases.

Technologies such as a Quasi-Zenith Satellite System and a Real Time Kinematic-Global Positioning System (RTK-GPS) allow a drone to accurately know the absolute position of the own plane in centimeters during flight. Thus, even in the typical small and complex farmland in Japan, it is possible to fly a drone autonomously with minimum manual control and to spray chemicals efficiently and accurately.

On the other hand, in some cases, safety considerations were not sufficient for autonomous drones intended for spraying agricultural chemicals. Since a drone loaded with chemicals weighs several tens of kilograms, a case of an accident such as falling onto a person may have serious consequences. Further, the operator of a drone is usually not an expert, so therefore a foolproof mechanism is required, but the consideration for this was insufficient. Until now, there have been drone safety technologies based on human control (for example, Patent Literature 2), but there was no technology for addressing safety issues specific to autonomous drones for spraying agricultural chemicals.

In order to fly a drone in a farm field, a movable body that transports the drone to a predetermined position around the farm field is required. Further, in order to fly and land the drone at/from the predetermined position, a drone system, in which the drone and the movable body transmit and receive information and cooperate to operate with each other, is required.

CITATION LIST

Patent Literature

Patent Literature 1: JP 2001-120151 A
Patent Literature 2: JP 2017-163265 A

SUMMARY OF INVENTION

Technical Problem

A drone system where a drone and a movable body, that is movable with loading the drone and where the drone can take off and land, cooperate to operate, and that is able to maintain high level of safety even during an autonomous flight, is provided.

Solution to Problem

In order to achieve the above-described problem, a drone system according to one aspect of the present invention has a drone and a movable body, which is movable with loading the drone, and where the drone can take off and land, and the drone and the movable body cooperate to operate. The drone has a flight controller controlling a flight of the drone, and a drone transmitter transmitting an information possible to distinguish whether the drone is in flight. The movable body has a take-off and landing area which becomes a take-off and landing point where the drone is loaded and where the drone takes off and lands, a movement controller loading the drone on the take-off and landing area and moving the movable body with the drone, a movable body receiver receiving an information from the drone, and a display unit indicating an information based on the information received from the drone. When the information indicating that the drone is in flight is received by the movable body receiver, at least one of a restriction of an operation of the movable body or an indication of the display unit is made different from a case when the drone is not in flight.

Further, when the information indicating that the drone is in flight is received by the movable body receiver and when the drone is determined in-flight, an operation of the movable body may be restricted.

Further, the indication of the display unit may be made different between a case where the information indicating that the drone is in flight is received by the movable body receiver and a case where the information indicating that the drone is not in flight is received by the movable body receiver.

Further, the movable body may have at least a mode switching mechanism capable of switching between a mode where the movable body can move and a mode where the drone can take off and land from the movable body, and when the information indicating that the drone is in flight is received by the movable body receiver, the movable body is held in a mode where the drone can take off and land.

Further, the movable body may have a mode acquisition unit capable of acquiring a mode of the movable body.

Further, the movable body may have a movable body transmitter capable of transmitting the mode of the movable body to the drone, and the drone determines a landing position of the drone based on the mode of the movable body.

Further, the drone may guide the movable body to a position where the drone can take off and land.

Further, the flight controller may determine whether the drone can land at the take-off and landing point of the drone based on the information of the movable body received from the drone.

Further, the movable body may have a peripheral environment acquisition unit to acquire an information related to a peripheral environment of the take-off and landing point, and the movable body can transmit the information related to the peripheral environment to the drone. In addition, the drone may determine whether the drone can land at the take-off and landing point based on the information related to the peripheral environment.

Further, the flight controller may acquire a position of the movable body and determine whether the drone can land at the take-off and landing point based on the position of the movable body.

Further, the flight controller may land the drone on a ground corresponding to a point where the drone has taken off when the flight controller determines that the drone cannot land at the take-off and landing point.

Further, the flight controller may land the drone in a target area where the drone operates when the flight controller determines that the drone cannot land at the take-off and landing point.

Further, the flight controller may stop a return of the drone and make the drone to hover at a predetermined point when the flight controller determines that the drone cannot land at the take-off and landing point.

Further, the movable body may have a movement detector detecting that the movable body has been moved while the drone is in flight, and an intervention operation unit transmitting an instruction to perform a retreat action to the drone. In addition, the intervention operation unit may transmit the instruction to perform the retreat action to the drone when the movement detector detects that the movable body has been moved.

Further, the intervention operation unit may generate an operating route of the drone from a predetermined position in a target area where the drone operates to the take-off and landing point and transmits to the drone.

Further, the movable body may acquire a remaining amount of a battery mounted on the drone, predict a flyable range of the drone based on the amount of the battery, and restrict a moving range of the movable body based on the flyable range.

Further, the system may have a rear display unit installing on a rear side of a body that covers a passenger seat of the movable body, or rear of the body, or a side of the body and indicating that the drone is operating.

Further, the system may have an upper display unit installing on an upper part of a body of the movable body and indicating that the drone is operating on a front side and a rear side of the body.

In order to achieve the above-described problem, a drone system control method according to another aspect of the present invention has a drone and a movable body, which is movable with loading the drone and where the drone can take off and land, and the drone and the movable body cooperate to operate. The movable body has a take-off and landing area which becomes a take-off and landing point where the drone is loaded and where the drone takes off and lands. The method has steps of controlling a flight of the drone, transmitting an information possible to distinguish whether the drone is in flight, loading the drone on the take-off and landing area and moving the movable body with the drone; receiving the information from the drone, indicating an information based on the information received from the drone, and making at least one of a restriction of an operation of the movable body or an indication of the display unit different from a case when the drone is not in flight when the information indicating that the drone is in flight is received by the step of receiving the information from the drone.

In order to achieve the above-described problem, a drone system control program according to another aspect of the present invention has a drone and a movable body, which is movable with loading the drone and where the drone can take off and land, and the drone and the movable body cooperate to operate. The movable body has a take-off and landing area which becomes a take-off and landing point where the drone is loaded and where the drone takes off and lands. The drone system control program for causing a computer to execute instructions for controlling a flight of the drone, transmitting an information possible to distinguish whether the drone is in flight, loading the drone on the take-off and landing area and moving the movable body with the drone, receiving the information from the drone, indicating an information based on the information received from the drone, and making at least one of a restriction of an operation of the movable body or an indication of the display unit different from a case when the drone is not in flight when the information indicating that the drone is in flight is received by the instruction for receiving the information from the drone.

In order to achieve the above-described problem, a movable body according to another aspect of the present invention, movable with loading a drone and possible for the drone to take off and land, has a take-off and landing area where the drone is loaded and becomes a take-off and landing point where the drone takes off and lands, a movement controller moving the movable body with the drone, a movable body receiver receiving an information from the drone, and a display unit indicating an information based on the information received from the drone. When the information indicating that the drone is in flight is received by the movable body receiver, at least one of a restriction of an operation of the movable body or an indication of the display unit is made different from a case when the drone is not in flight.

In order to achieve the above-described problem, a drone according to another aspect of the present invention, loaded on a movable body and possible for moving with the movable body, has a flight controller controlling a flight of the drone, and a drone transmitter transmitting an information possible to distinguish whether the drone is in flight. The movable body has a take-off and landing area where the drone is loaded and becomes a take-off and landing point where the drone takes off and lands, a movement controller loading the drone on the take-off and landing area and moving the movable body with the drone, a movable body receiver receiving an information from the drone, and a display unit indicating an information based on the information received from the drone. When the information indicating that the drone is in flight is received by the movable body receiver, at least one of a restriction of an operation of the movable body or an indication of the display unit is made different from a case when the drone is not in flight.

Advantageous Effects of Invention

A drone and a movable body that is movable with loading the drone and where the drone can take off and land, cooperate to operate, and that is able to maintain high level of safety even during autonomous flight, is provided.

DESCRIPTION OF EMBODIMENTS

Figure 1:
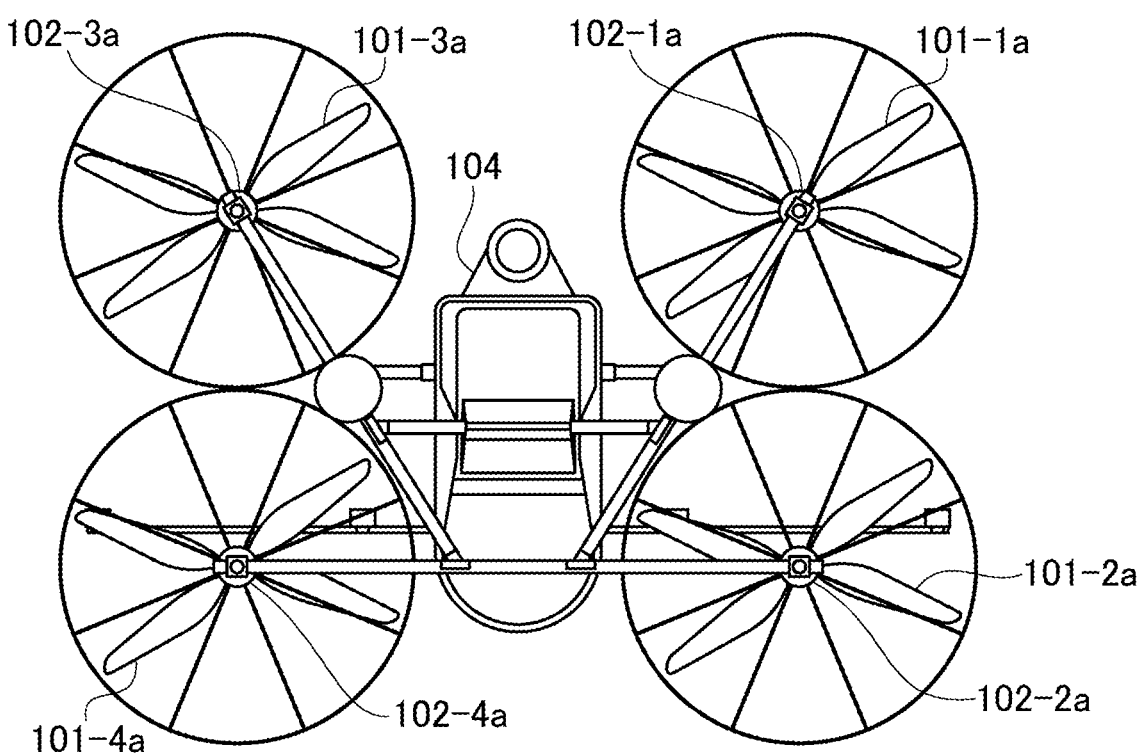
FIG. 1 is a plan view of the first embodiment of the drone system according to the present invention.

Hereinafter, embodiments for carrying out the present invention will be described with reference to the drawings. All drawings are illustrations. In the following detailed description, certain details are given for illustration purposes and to facilitate a complete understanding of the disclosed embodiments. However, the embodiments are not limited to these particular details. In addition, for simplification of the drawings, well-known structures and devices are outlined.

First, a configuration of a drone provided in a drone system according to the present invention will be described. In the specification of the present application, a term drone refers to a general aerial vehicle having a plurality of rotor blades regardless of a power unit (an electric power, motor, etc.) and an operation method (whether it is wireless or wired and whether it is autonomous flying type or a manually controlled type, etc.).

As illustrated in FIG. 1 to FIG. 5, rotor blades 101-1*a*, 101-1*b*, 101-2*a*, 101-2*b*, 101-3*a*, 101-3*b*, 101-4*a*, 101-4*b* (also called rotors) are units for flying the drone 100. Eight rotor blades (four sets of two-stage rotor blades) are provided in consideration of the balance of flight stability, airframe size, and battery consumption. Each of the rotor blades 101 is arranged on four sides of the main body 110 by arms extending from the main body 110 of the drone 100. In other words, the rotor blades 101-1*a*, 101-1*b* are arranged on a left rear in a traveling direction, the rotor blades 101-2*a*, 101-2*b* are arranged on a left front in the traveling direction, the rotor blades 101-3*a*, 101-3*b* are arranged on a right rear in the traveling direction, and the rotor blades 101-4*a*, 101-4*b* are arranged on a right front in the traveling direction. It should be noted that the traveling direction of the drone 100 is downward in the drawing in FIG. 1. Rod-shaped legs 107-1, 107-2, 107-3, 107-4 extend downward from each rotor axis of the rotor blades 101.

Figure 2:
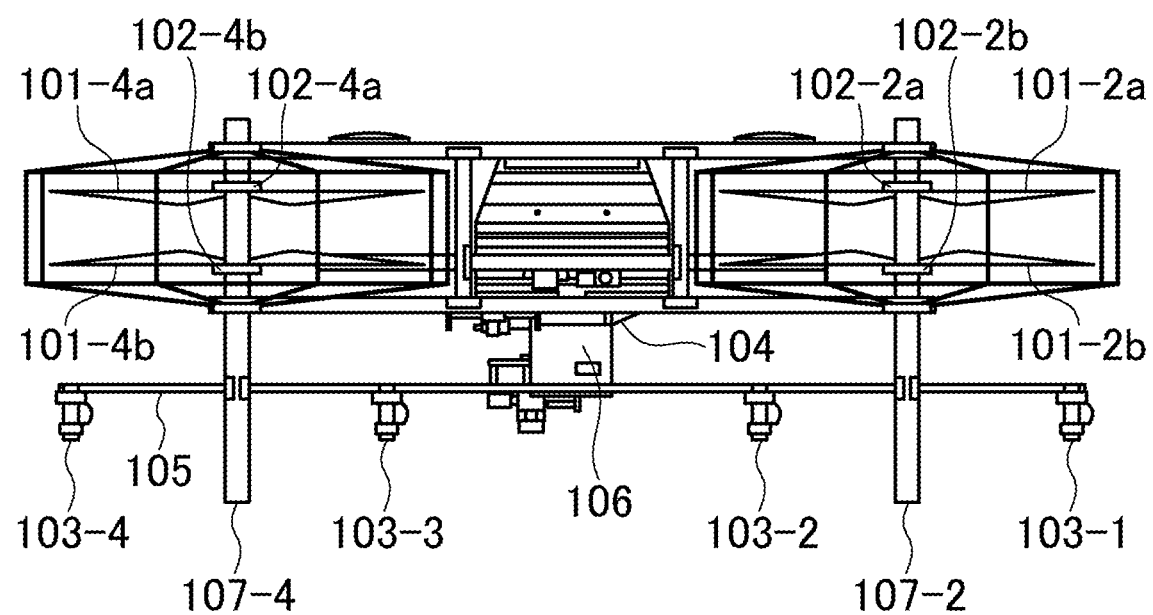
FIG. 2 is a front view of the drone which the above mentioned drone system has.
Figure 3:
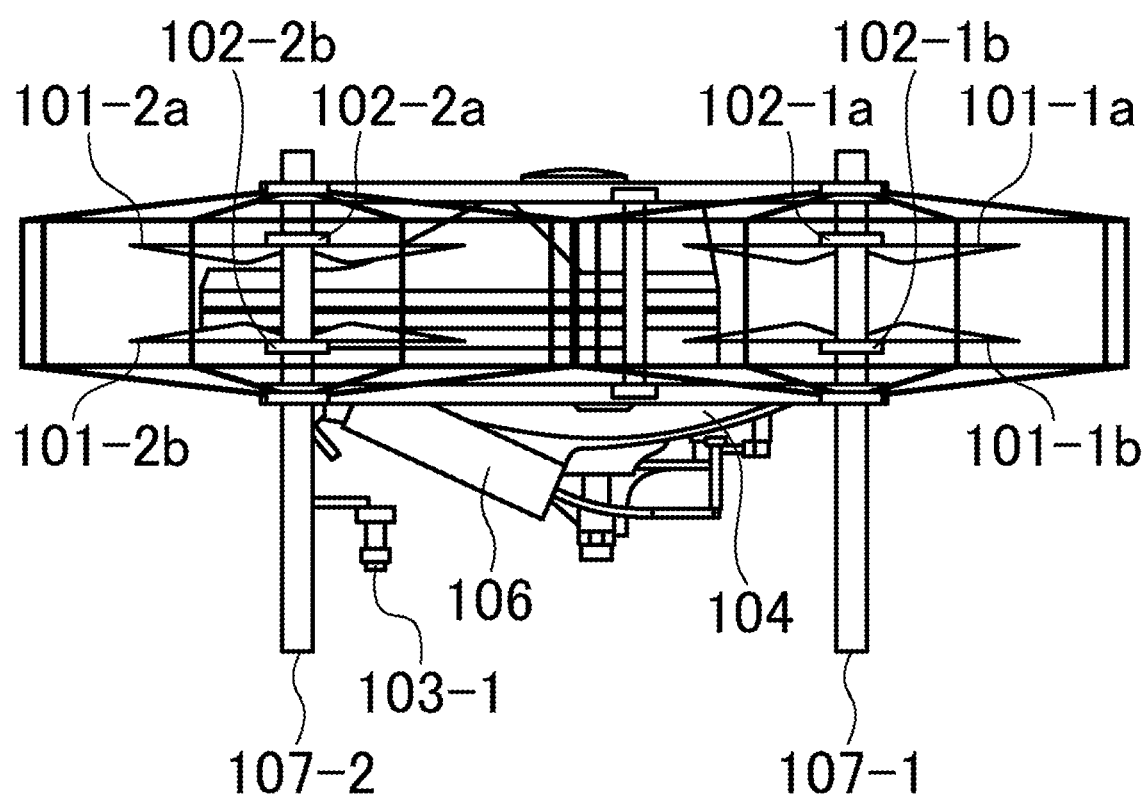
FIG. 3 is a right side view of the drone mentioned above.
Figure 4:
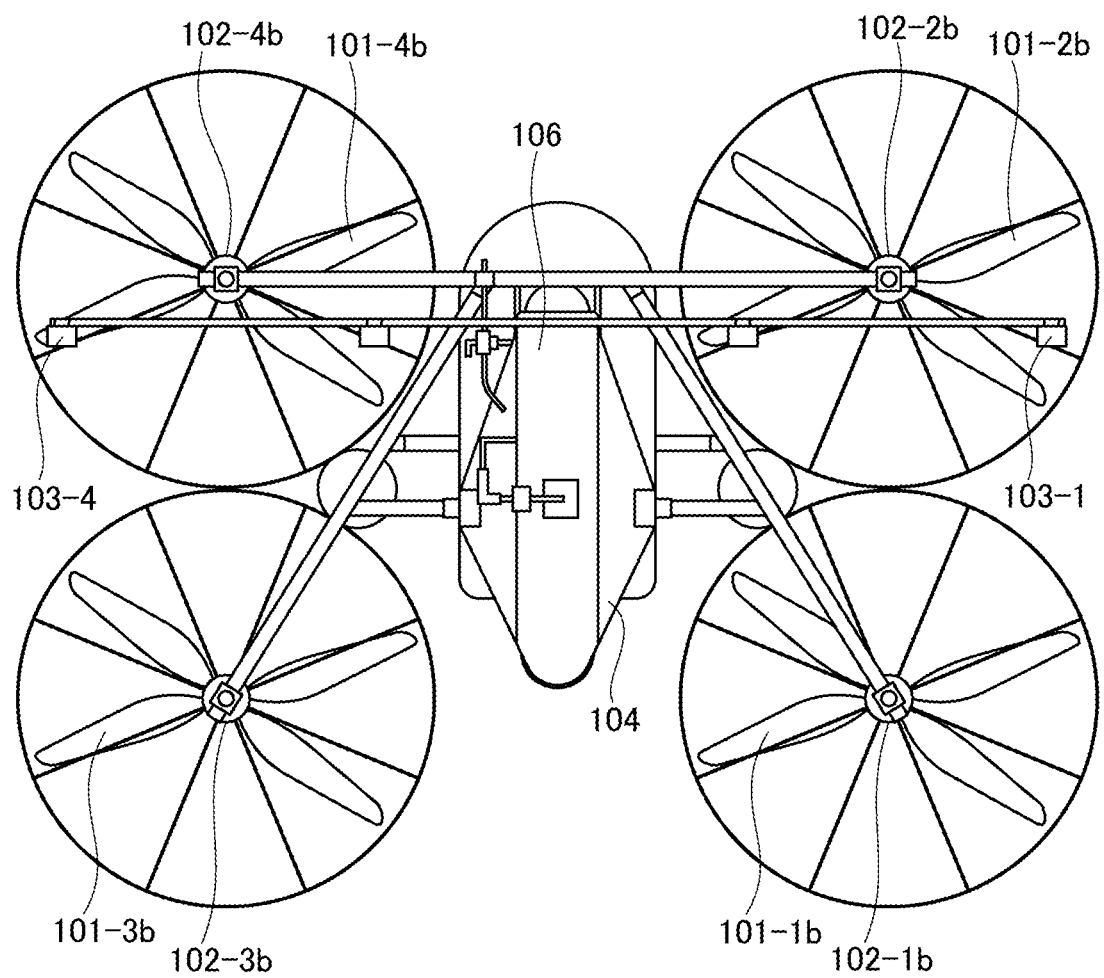
FIG. 4 is a rear view of the drone mentioned above.
Figure 5:
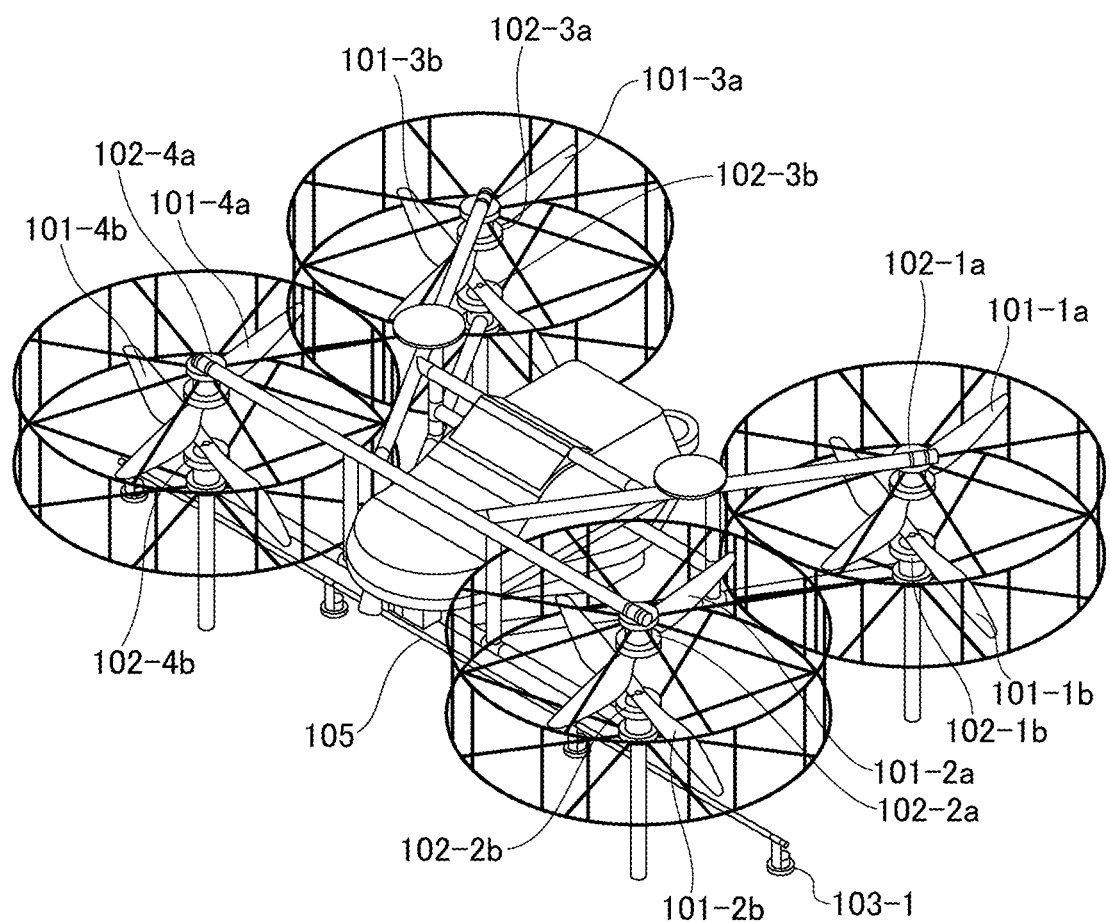
FIG. 5 is a perspective view of the drone mentioned above.

Motors 102-1*a*, 102-1*b*, 102-2*a*, 102-2*b*, 102-3*a*, 102-3*b*, 102-4*a*, 102-4*b* are units (which are typically an electric motor but may be a motor or the like) for rotating the rotor blades 101-1*a*, 101-1*b*, 101-2*a*, 101-2*b*, 101-3*a*, 101-3*b*, 101-4*a*, 101-4*b*, and one motor is installed in one rotor blade. The motors 102 are examples of propulsion units. In the upper and lower rotor blades (for example, 101-1*a* and 101-1*b*) and the corresponding motors (for example, 102-1*a* and 102-1*b*) in one set are colinear in their axes and rotate in opposite directions to each other for the flight stability of the drone. As illustrated in FIGS. 2 and 3, a radial member for supporting a propeller guard, which is provided such that a rotor does not interfere with foreign matters, is not horizontal but a roof structure. The structure promotes the buckling deformation of the member toward the rotor at the time of collision to prevent the member from interfering with the rotor.

Chemical nozzles 103-1, 103-2, 103-3, 103-4 are units for spraying chemicals downward, and four chemical nozzles are preferably provided. In this description, the chemicals are generally referred to as liquids or powders sprayed on the farm field such as pesticides, herbicides, liquid fertilizers, insecticides, seeds, and water.

A chemical tank 104 is a tank for storing chemicals to be sprayed, and is provided at a position close to the center of gravity of the drone 100 and lower than the center of gravity from the viewpoint of weight balance. Chemical hoses 105-1, 105-2, 105-3, 105-4 are units for connecting the chemical tank 104 with respective chemical nozzles 103-1, 103-2, 103-3, 103-4. The chemical hoses may be made of a hard material and may also serve to support the chemical nozzle. A pump 106 is a unit for discharging the chemicals from the nozzle.

Figure 6:
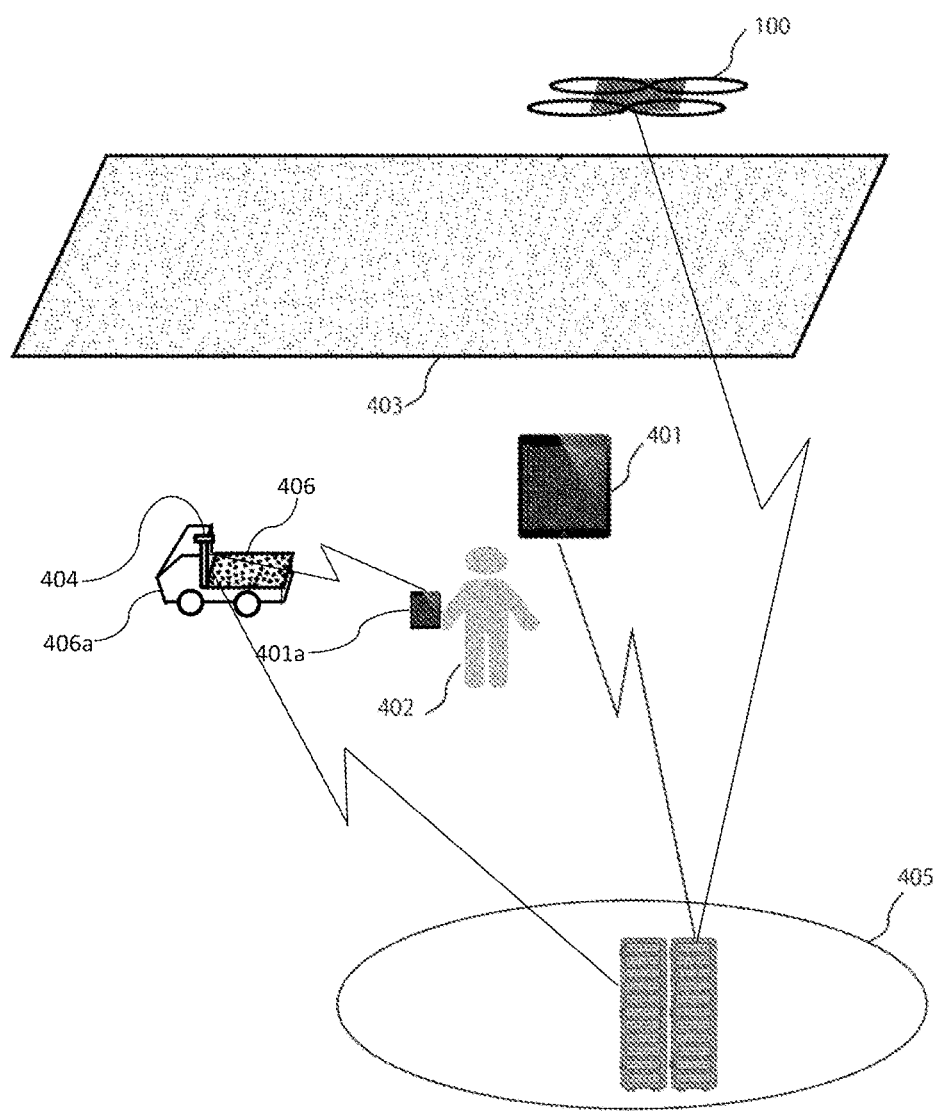
FIG. 6 is an overall conceptual view of a chemical spraying system that the above mentioned drone has.

FIG. 6 illustrates an overall conceptual diagram of a system using an embodiment of a chemical spraying application of the drone 100 according to the present invention. This drawing is a schematic view, and the scale is not accurate. As shown in this figure, the drone 100, a remote controller 401, and a base station 404 are respectively connected to a farming support cloud 405. In addition, a small mobile terminal 401a is connected to the base station 404. These connections may be wireless communication by Wi-Fi, mobile communication systems, and the like, or may be partially or entirely wired.

The remote controller 401 has a unit for transmitting an instruction to the drone 100 by an operation of a user 402 and indicating information, such as a position, a chemical amount, a battery level, and a camera image, received from the drone 100. The remote controller 401 may be realized by a portable information device such as a general tablet terminal for operating a computer program. The drone 100 according to the present invention may be controlled to perform autonomous flight. However, a manual operation may be performed at the time of basic operation such as take-off and return and emergency. In addition to the portable information devices, an emergency controller having an exclusive emergency stop function may be used (the emergency controller may be a dedicated device which is equipped with a large emergency stop button or the like so as to be able to respond quickly in case of emergency). Further, aside from the remote controller 401, the system may include a small mobile terminal 401a, for example a smart phone, which is able to indicate a part or all of the information indicated on the remote controller 401. Further, the system may have a function of changing an operation of the drone 100 based on the information input from the small mobile terminal 401a. The small mobile terminal 401a is connected to the base station, for example, and can receive information from the farming support cloud 405 through the base station 404.

A farm field 403 is a rice field, an upland field, or the like, targeted for chemical spraying by the drone 100. Actually, the topography of the farm field 403 is complicated, and there is a case where the topographic map cannot be obtained in advance, or the topographic map and the situation of the site are inconsistent. Usually, the farm field 403 is adjacent to a house, a hospital, a school, a farm field for other crops, a road, a railroad, and the like. Further, there may also be obstacles such as buildings and electric wires in the farm field 403.

The base station 404 is a device which provides a master unit function of Wi-Fi communication and the like. The base station may also function as an RTK-GPS base station to provide the accurate position of the drone 100 (The master unit function of Wi-Fi communication and the RTK-GPS base station may be independent devices.). Further, the base station 404 may be able to communicate with the farming support cloud 405 by using mobile communication systems, such as 3G, 4G, LTE, and the like. In the present embodiment, the base station 404 is loaded on a movable body 406a with a take-off and landing point 406.

The farming support cloud 405 is typically a group of computers operated on a cloud service, and the farming support cloud 405 may be wirelessly connected to the remote controller 401 via a mobile phone line or the like. The farming support cloud 405 may analyze the image of the farm field 403 photographed by the drone 100, grasp the growth state of crops, and perform processing for determining a flight route. Further, the drone 100 may be provided with the stored topographical information or the like of the farm field 403. In addition, the history of the flight of the drone 100 and photographed images may be accumulated to perform various analysis processes.

Usually, the drone 100 takes off from the take-off and landing point 406 outside the farm field 403, and returns to the take-off and landing point 406 after spraying chemicals on the farm field 403, or when it becomes necessary to refill the chemicals or charge. A flight route (an intrusion pathway) from the take-off and landing point 406 to a target farm field 403 may be saved in advance by the farming support cloud 405 and the like, or may be input by the user 402 before a start of takeoff.

Figure 25:
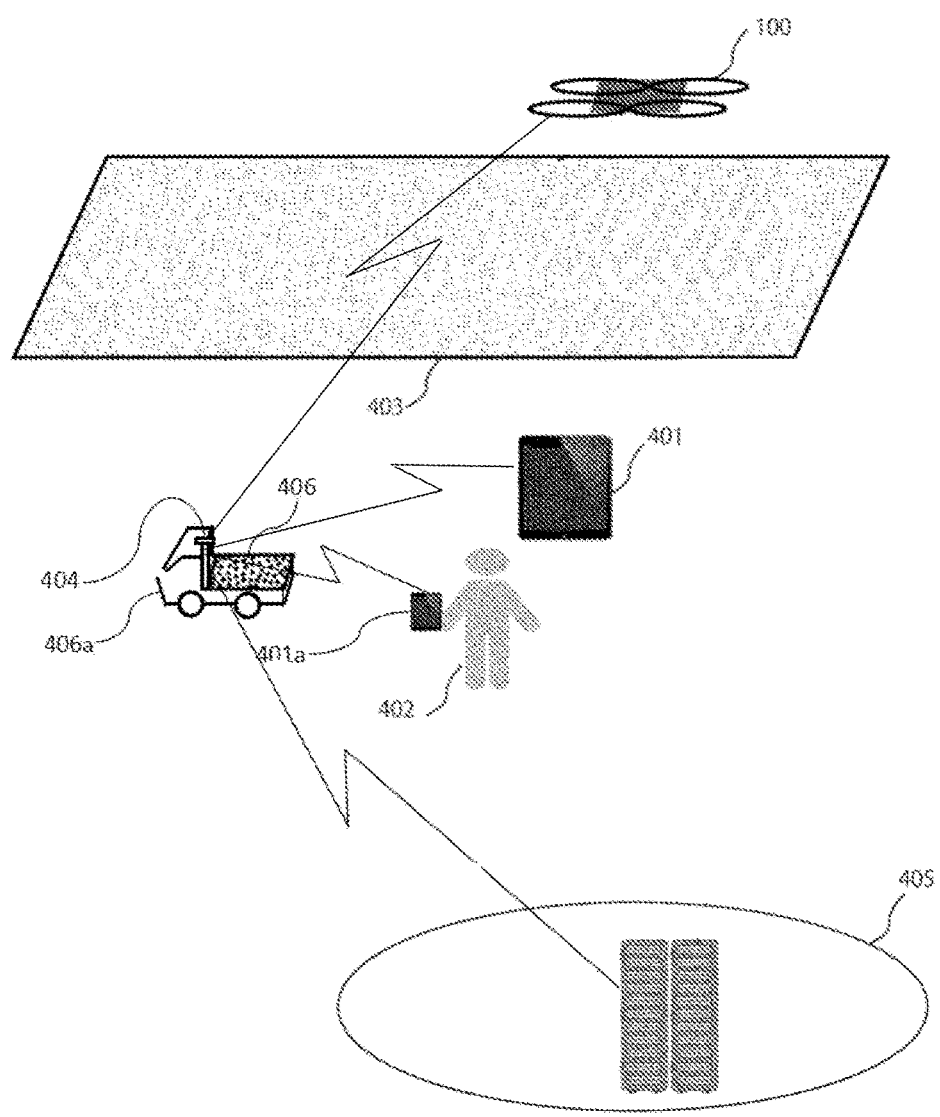
FIG. 25 is an overall conceptual view of the eleventh embodiment of the chemical spraying system that the above mentioned drone has.

As in the eleventh embodiment shown in FIG. 25, the chemical spraying system of the drone 100 according to the present invention may have a configuration in which the drone 100, the remote controller 401, the small mobile terminal 401a, and the farming support cloud 405 are respectively connected to the base station 404.

Figure 26:
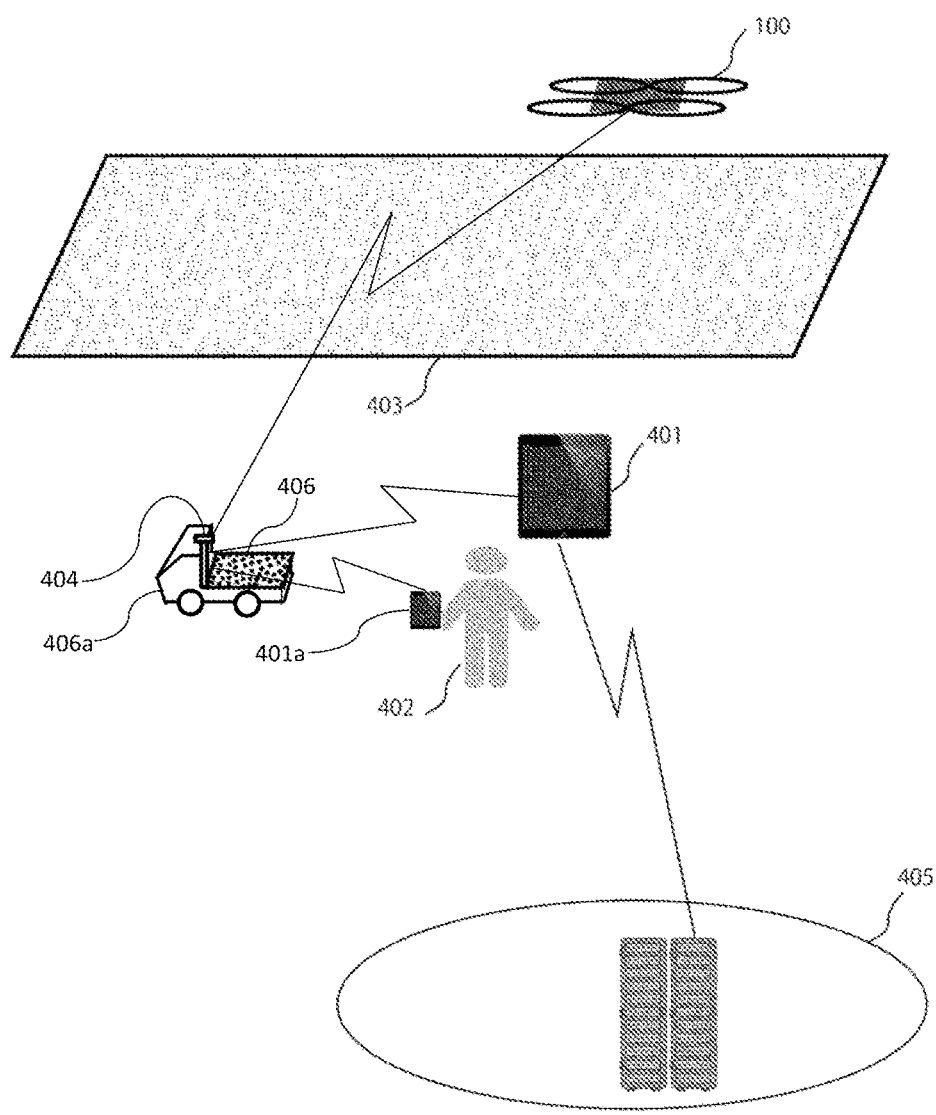
FIG. 26 is an overall conceptual view of the twelfth embodiment of the chemical spraying system that the above mentioned drone has.

Further, as in the twelfth embodiment shown in FIG. 26, the chemical spraying system of the drone 100 according to the present invention may have a configuration in which the drone 100, the remote controller 401, and the small mobile terminal 401a are respectively connected to the base station 404 and only the remote controller 401 is connected to the farming support cloud 405.

Figure 7:
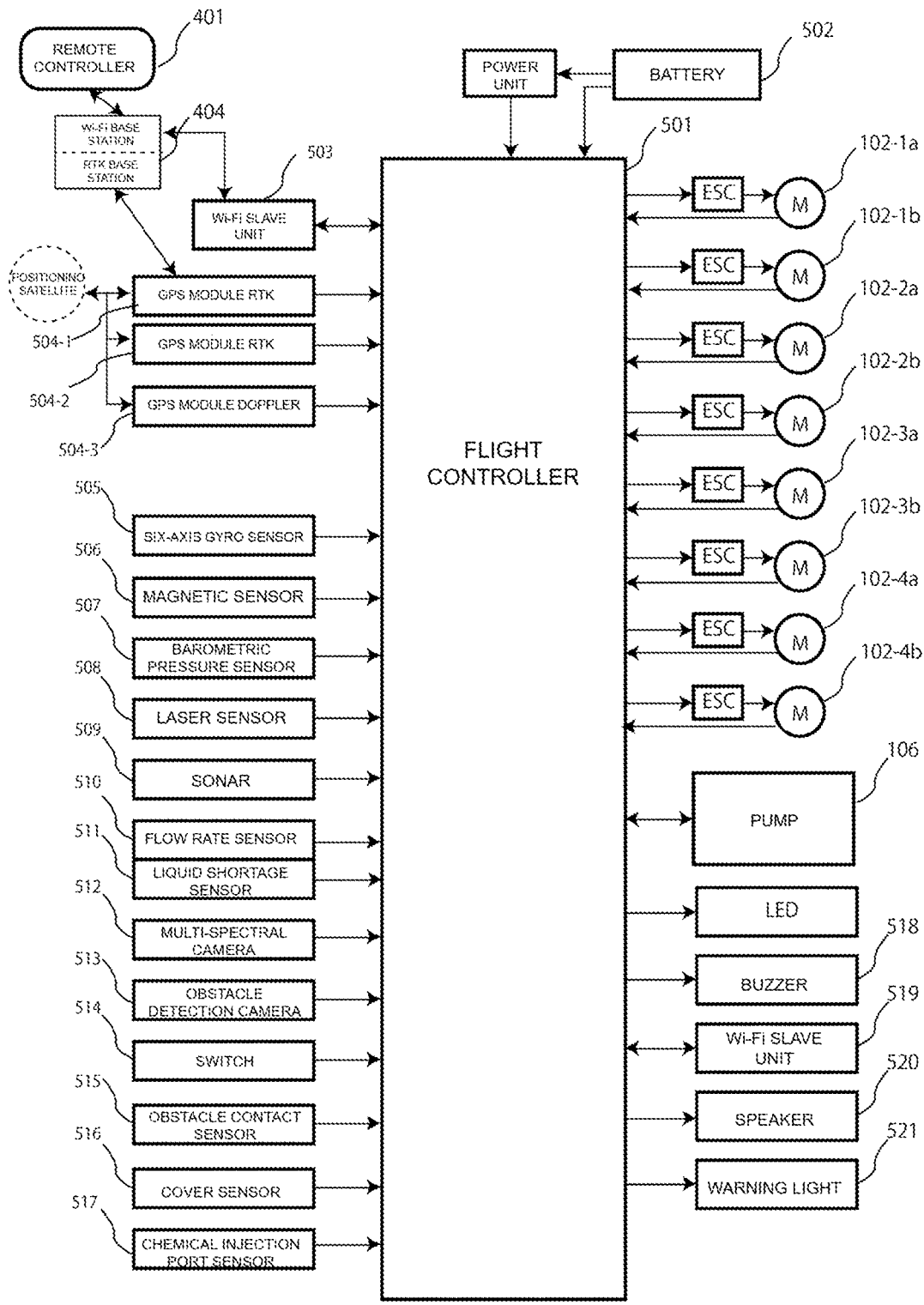
FIG. 7 is a schematic view illustrating a control function of the drone system mentioned above.

FIG. 7 is a block diagram illustrating a control function of the embodiment of the chemical spraying drone according to the present invention. A flight controller 501 is a component which controls the entire drone, and specifically may be an embedded computer including a CPU, memory, related software, and the like. The flight controller 501 controls the flight of the drone 100 by controlling rotation speeds of the motors 102-1a, 102-1b, 102-2a, 102-2b, 102-3a, 102-3b, 104-a, 104-b with control means such as electronic speed control (ESC) on the basis of the input information received from the remote controller 401 and the input information obtained from various sensors described later. It has a configuration that the actual rotation speed of the motors 102-1a, 102-1b, 102-2a, 102-2b, 102-3a, 102-3b, 104-a, 104-b is fed back to the flight controller 501 to monitor whether a normal rotation is performed. Alternatively, the rotor blade 101 may be provided with an optical sensor or the like so that the rotation of the rotor blade 101 is fed back to the flight controller 501.

The software used by the flight controller 501 can be rewritable through a storage medium or the like for a function expansion or change, a problem correction, or the like, or through communication means such as Wi-Fi communication or USB. In this case, the protection by encryption, checksum, electronic signature, virus check software, and the like prevents rewriting performed by unauthorized software. In addition, apart of a calculation process used in the control by the flight controller 501 may be executed by another computer existing on the remote controller 401, the farming support cloud 405, or another place. Since the flight controller 501 is highly important, some or all of the components thereof may be duplexed.

The flight controller 501 can interact with the remote controller 401 via a Wi-Fi slave unit function 503 and further via the base station 404 so as to receive a necessary instruction from the remote controller 401 and transmit necessary information to the remote controller 401. In this case, it is possible to encrypt the communication so as to prevent illegal acts such as interception, spoofing, and hijacking of equipment. The base station 404 has an RTK-GPS base station function in addition to a Wi-Fi communication function. By combining a signal from the RTK base station and a signal from a GPS positioning satellite, a GPS module 504 can measure the absolute position of the drone 100 with an accuracy of about several centimeters. Since the GPS module 504 is highly important, it may duplex and multiplex the GPS module 504. Further, in order to handle a failure of a specific GPS satellite, each of redundant GPS modules 504 may be controlled to use another satellite.

A six-axis gyro sensor 505 is a unit to measure an acceleration of a drone body in three axis directions orthogonal to each other (Further, it is a unit to calculate a speed by integrating the acceleration). Furthermore, the six-axis gyro sensor 505 is a unit to measure a change in an altitude angle of the drone body in the above-mentioned three axis directions, such as an angular velocity. A geomagnetic sensor 506 is a unit which measures the direction of the drone body by measuring geomagnetism. A barometric pressure sensor 507 is a unit which measures atmospheric pressure, and can indirectly measure the altitude of the drone. A laser sensor 508 is a unit which measures a distance between the drone body and a ground surface by utilizing the reflection of laser light, and may use an IR (infrared) laser. A sonar 509 is a unit which measures the distance between the drone body and the ground surface by utilizing the reflection of sound waves such as ultrasonic waves. These sensors may be selected according to the cost target and performance requirements of the drone. Further, a gyro sensor (angular velocity sensor) for measuring the tilt of the airframe, a wind force sensor for measuring wind force, and the like may be added. Further, these sensors may be duplexed or multiplexed. In a case where there are multiple sensors for the same purpose, the flight controller 501 may use only one of the sensors, and when the sensor fails, the sensor may be switched to use an alternative sensor. Alternatively, a plurality of sensors may be used at the same time, and a case where respective measurement results do not match may be considered that a failure occurs.

A flow rate sensor 510 is a unit for measuring the flow rate of the chemicals, and the flow rate sensors are provided at a plurality of places on a route from the chemical tank 104 to the chemical nozzle 103. A liquid shortage sensor 511 is a sensor which detects that the amount of the chemicals is equal to or less than a predetermined amount. A multi-spectral camera 512 is a unit which photographs the farm field 403 and obtains data for image analysis. An obstacle detection camera 513 is a camera for detecting drone obstacles. The obstacle detection camera has different image characteristics and lens direction from those of the multi-spectral camera 512, so that the obstacle detection camera is different from the multi-spectral camera 512. A switch 514 is a unit for the user 402 of the drone 100 to make various settings. An obstacle contact sensor 515 is a sensor for detecting that the drone 100, particularly, a rotor or a propeller guard part thereof is in contact with an obstacle such as an electric wire, a building, a human body, a standing tree, a bird, or other drones. A cover sensor 516 is a sensor which detects that an operation panel of the drone 100 and a cover for internal maintenance are open. A chemical injection port sensor 517 is a sensor which detects that the injection port of the chemical tank 104 is open. These sensors may be selected according to the cost target and performance requirements of the drone and may be duplexed or multiplexed. Further, a sensor may be provided at the base station 404 outside the drone 100, the remote controller 401, or other places, and the read information may be transmitted to the drone. For example, a wind force sensor may be provided in the base station 404, and information regarding wind force and a wind direction may be transmitted to the drone 100 via Wi-Fi communication.

The flight controller 501 transmits a control signal to the pump 106 to adjust the discharging amount of the chemicals and stop the chemical discharging. It is desirable that the current state (for example, the rotation speed) of the pump 106 is fed back to the flight controller 501.

An LED 107 is a display unit for notifying a drone operator of a state of the drone. Instead of or in addition to the LED, a display unit such as a liquid crystal display may be used. A buzzer 518 is an output unit for notifying the state of the drone (particularly an error state) by an audio signal. A Wi-Fi slave unit function 519 is an optional component for communicating with an external computer or the like for the transfer of software, for example, separately from the remote controller 401. Instead of or in addition to the Wi-Fi slave unit function, another wireless communication means such as infrared communication, Bluetooth (registered trademark), ZigBee (registered trademark), and NFC or wired communication means such as USB connection may be used. Further, instead of the Wi-Fi slave unit function, mutual communication may be possible by mobile communication systems, such as 3G, 4G, LTE, and the like. A speaker 520 is an output unit for notifying the drone state (particularly an error state) by the recorded human voice, synthesized voice, or the like. Depending on the weather conditions, it may be difficult to see the visual display unit of the drone 100 in flight, and in such a case, it is effective to communicate the situation by voice. A warning light 521 is a display unit such as a strobe light for notifying the drone state (particularly an error state). These input/output units may be selected according to the cost target and performance requirements of the drone and may be duplexed or multiplexed.

Figure 10:
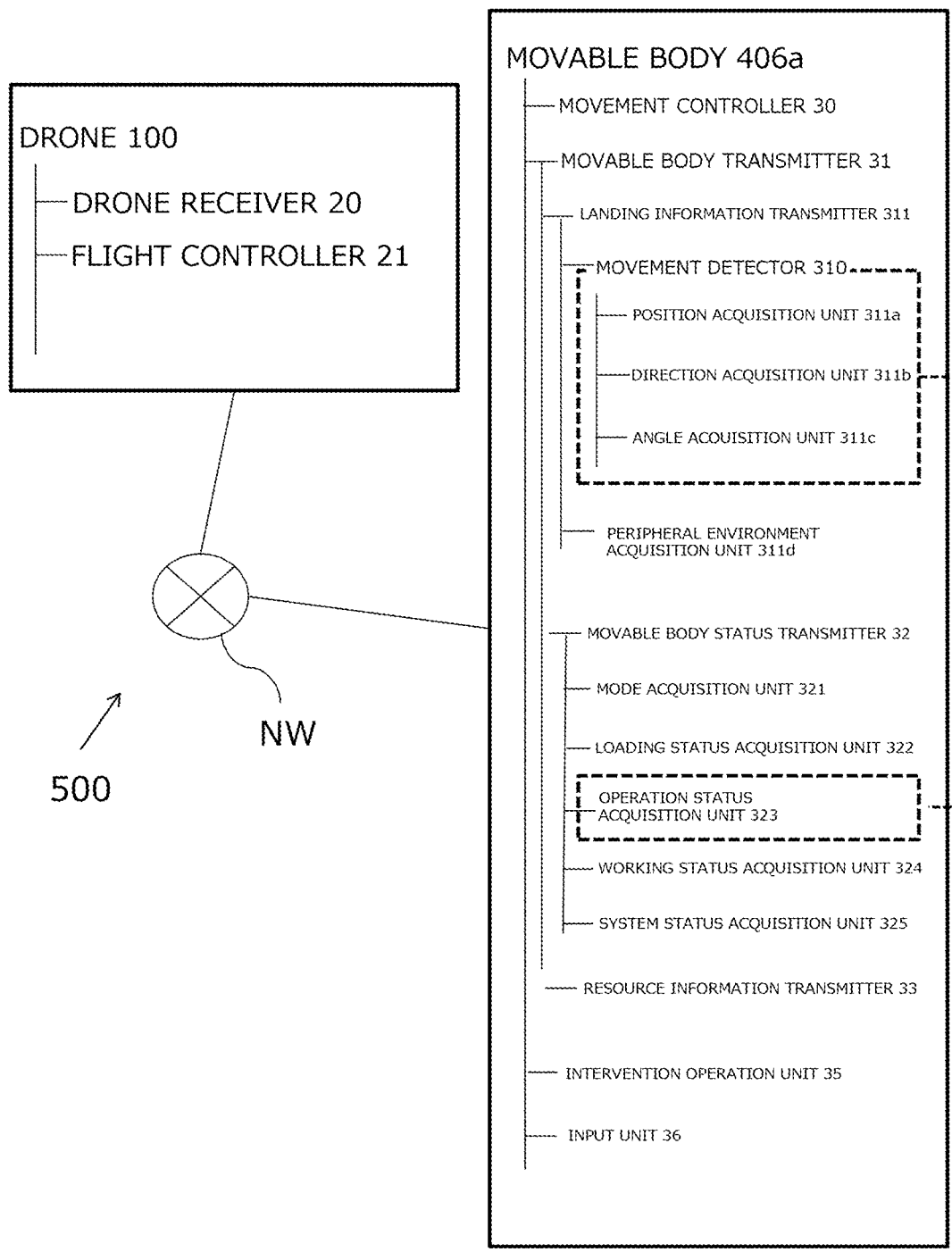
FIG. 10 is a functional block diagram of the drone mentioned above and the movable body mentioned above with respect to operations of transmitting an information from the movable body mentioned above and receiving by the drone mentioned above.

As illustrated in FIG. 10, a drone system 500 roughly includes the drone 100 and the movable body 406a connected to each other through a network NW. The drone 100 and the movable body 406a transmit and receive information to each other and cooperate to operate. The take-off and landing point 406 in FIG. 6 is formed on the movable body 406a. The drone 100 has a flight controller 21 controlling a flight of the drone 100 a functional unit for transmitting and receiving information to and from the movable body 406a. Each functional unit of the drone 100 is provided in the flight controller 501 shown in FIG. 7. The drone 100 and the movable body 406a may be connected wired instead of being connected through the network NW.

The drone system 500 may include a mobile terminal, such as a smart phone and the like, in addition to the drone 100 and the movable body 406a. On a display unit of the mobile terminal, information of an expected operation of the drone 100, more specifically a schedule time for the drone 100 to return to the take-off and landing point 406 and information of a content of an operation to be performed by the user 402 at a time of return. Further, the operation of the drone 100 and the movable body 406a may be changed based on an input from the mobile terminal. The mobile terminal can receive the information from either the drone 100 or the movable body 406a. In addition, the information from the drone 100 may be transmitted to the movable body 406a through the mobile terminal.

Structure of the Movable Body

Figure 8:
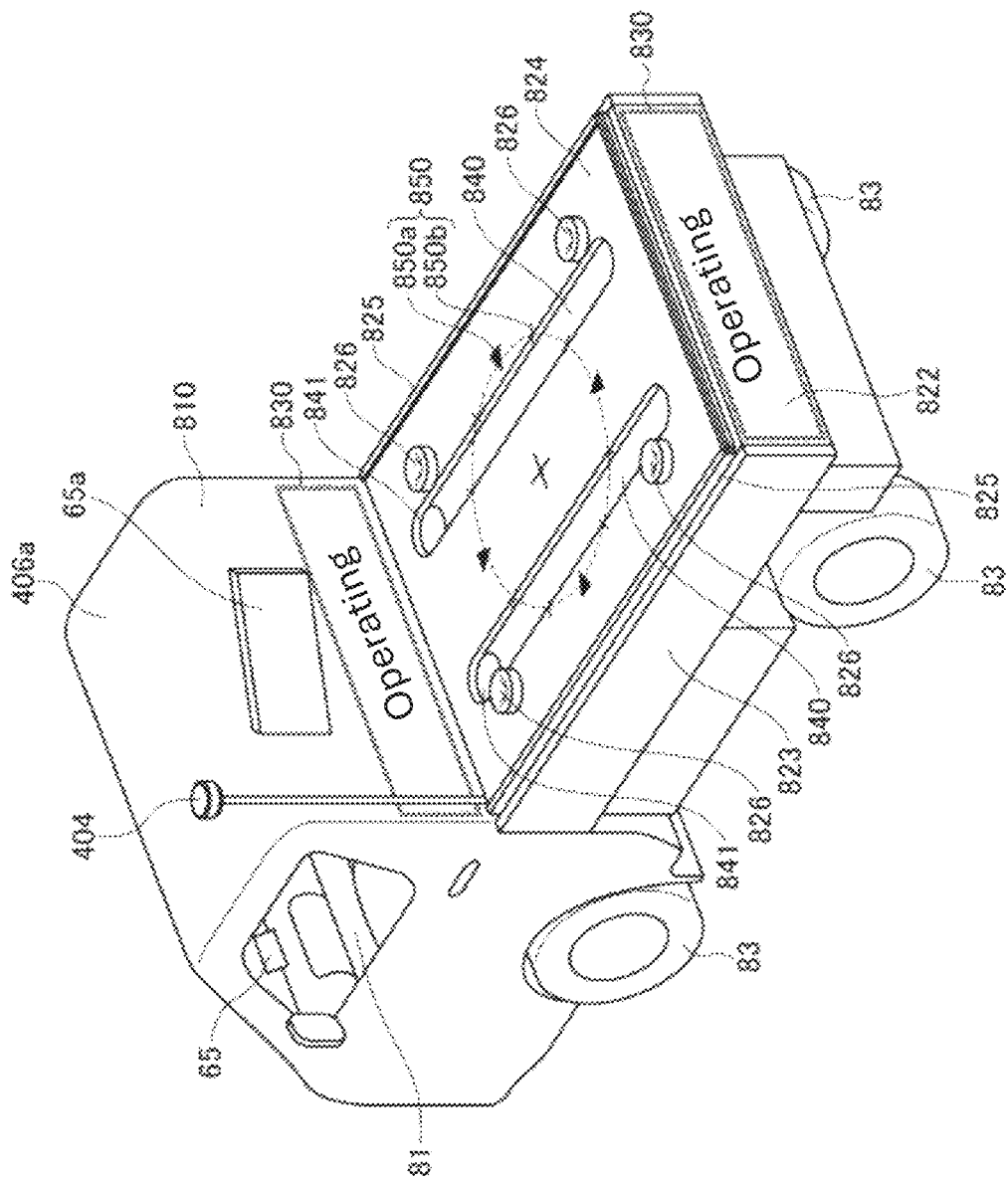
FIG. 8 is a schematic perspective view illustrating how the drone mentioned above is loaded on the movable body according to the present invention.
Figure 9:
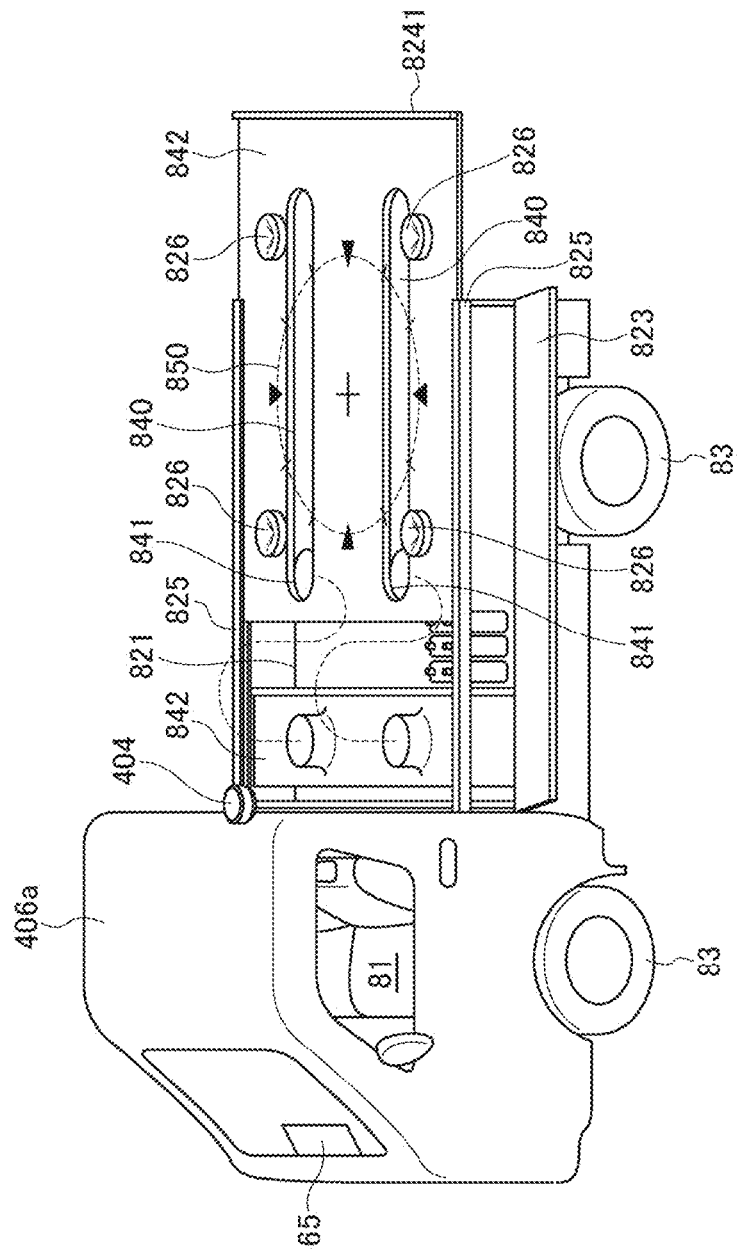
FIG. 9 is a schematic perspective view illustrating how atop plate placed on the drone mentioned above slides backward while the drone mentioned above is loaded on the movable body mentioned above.

As illustrated in FIG. 8 and FIG. 9, the movable body 406a is a device to receive the information held by the drone 100, appropriately notify the user 402, or receive an input from the user 402 and transmit to the drone 100. In addition, the movable body 406a can load the drone 100 and move. The movable body 406a may be driven by the used 402 or may be autonomously moved. The movable body 406a in the present embodiment is assumed to be a vehicle such as an automobile, more specifically a mini truck, but it may be an appropriate movable body capable of traveling on lands such as a train, or it may be a ship or an aircraft. A drive source of the movable body 406a may be an appropriate one such as gasoline, electricity, a fuel cell and the like.

The movable body 406a is a vehicle in which a passenger seat 81 is arranged in a front in a traveling direction and a loading platform 82 is arranged in rear in the traveling direction. Four wheels, which are examples of moving means, are arranged on a bottom surface side of the movable body 406a to be able to be driven. The user 402 can take the passenger seat 81.

A display unit 65 indicating states of the movable body 406a and the drone 100 is arranged on the passenger seat 81. The display unit 65 may be a device having a display or may be realized by a mechanism for projecting information on a windshield. Further, in addition to this display unit 65, a rear display unit 65a may be arranged on a rear side of a vehicle body 810 covering the passenger seat 81. This rear display unit 65a can change an angle with respect to the vehicle body 810 to the left and right, and the user 402 operating behind and on the left and right sides of the loading platform 82 can acquire information by looking at the display.

The base station 404 having a shape in which a disk-shaped member is connected to an upper portion of a round bar extends upward from the passenger seat 82 at a left end of a front part of the loading platform 82 of the moving body 406a. The shape and position of the base station 404 are arbitrary. With a configuration in which the base station 404 is located on a side of the passenger seat 81 of the loading platform 82, the base station 404 is less likely to interfere with the take-off and landing of the drone 100 compared with a configuration in which the base station 404 is located behind the loading platform 82.

The loading platform 82 has a battery 502 of the drone 100 and a cargo compartment 821 storing chemicals to be refilled to the chemical tank 104 of the drone 100. The cargo compartment 821 is an area surrounded by a vehicle body 810 covering the passenger seat 81, a rear plate 822, a pair of side plates 823, 823, and a top plate 824. The rear plate 822 and the side plate 823 are also referred to as "gates" ("aori" in Japanese). Rails 825 are arranged along upper ends of the side plates 823 to the vehicle body 810 of the rear side of the passenger seat 81 at each of upper ends of the rear plate 822. The top plate 824 is the take-off and landing area which is the take-off and landing point 406 on which the drone 100 is placed and can take off and land, and is slidable back and forth along the rail 825 in the traveling direction. The rail 825 has ribs projecting upward from a plane of the top plate 824 to prevent the drone 100 mounted on the top plate 824 from slipping out from the left and right ends of the movable body 406a. A rib 8241 projecting to atop plate side, as much as the rail 825 is formed, behind the top plate 824.

A warning light 830, indicating that the drone system 500 is operating, may be arranged on an upper part of the vehicle body 810 and a rear side of the rear plate 822 in the traveling direction, that is, the rear side of the vehicle body 810, the rear of the vehicle body 810, or the sides of the vehicle body 810. The warning light 830 is an example of a rear display unit. The warning light 830 may be a display unit to distinguish an operating state and a non-operating state by color scheme or blinking, or may be capable of indicating characters, patterns, and the like. Further, the warning light 830 on the upper part of the vehicle body 810 may extend to upward of the vehicle body 810 and can be indicated on both sides. According to this configuration, even when the drone 100 is loaded on the loading platform 82, the warning can be visually recognized from the rear. In addition, the warning can be visually recognized from the front of the moving body 406a in the traveling direction. The warning light 830 placed on the upper part of the vehicle body 810 is an example of the upper display unit. If there is no indication of the warning light 830, even if the movable body 406a is stopped on the road and waiting for the return of the drone 100, people and cars will enter the vicinity, so it is necessary to separately install an indication light and the like for restricting the entry into an entrance. On the other hand, since the warning light 830 can be visually recognized from the front and the rear, it is possible to save labor for separately installing an indication light or the like.

The top plate 824 may be manually slidable or may be automatically slidable using a rack and pinion mechanism or the like. When the top plate 824 is slid backward, articles can be stored in and taken out from the cargo compartment 821, from an upper region of the loading platform 82. In the case where the top plate 824 slides backward, since the top plate 824 and the vehicle body 810 are sufficiently separated from each other, the drone 100 can take off and land at the take-off and landing point 406.

Figure 27:
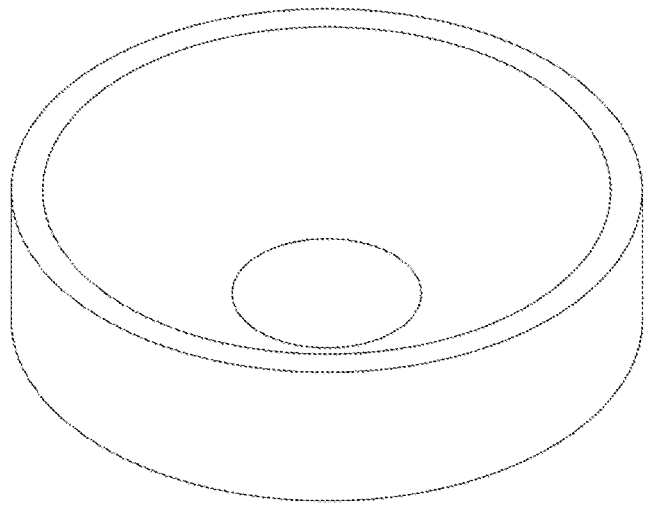
FIG. 27 (*a*) is a perspective view of a leg receiver arranged on the movable body according to the present invention, and FIG. 27 (*b*) is a vertical cross-sectional view of the leg receiver arranged on the movable body according to the present invention.
Figure 27:
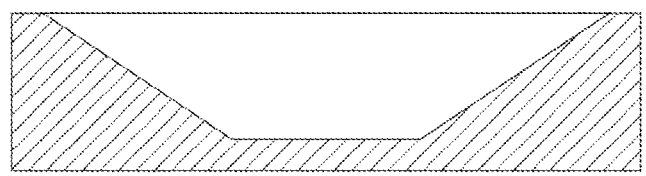
Figure 28:
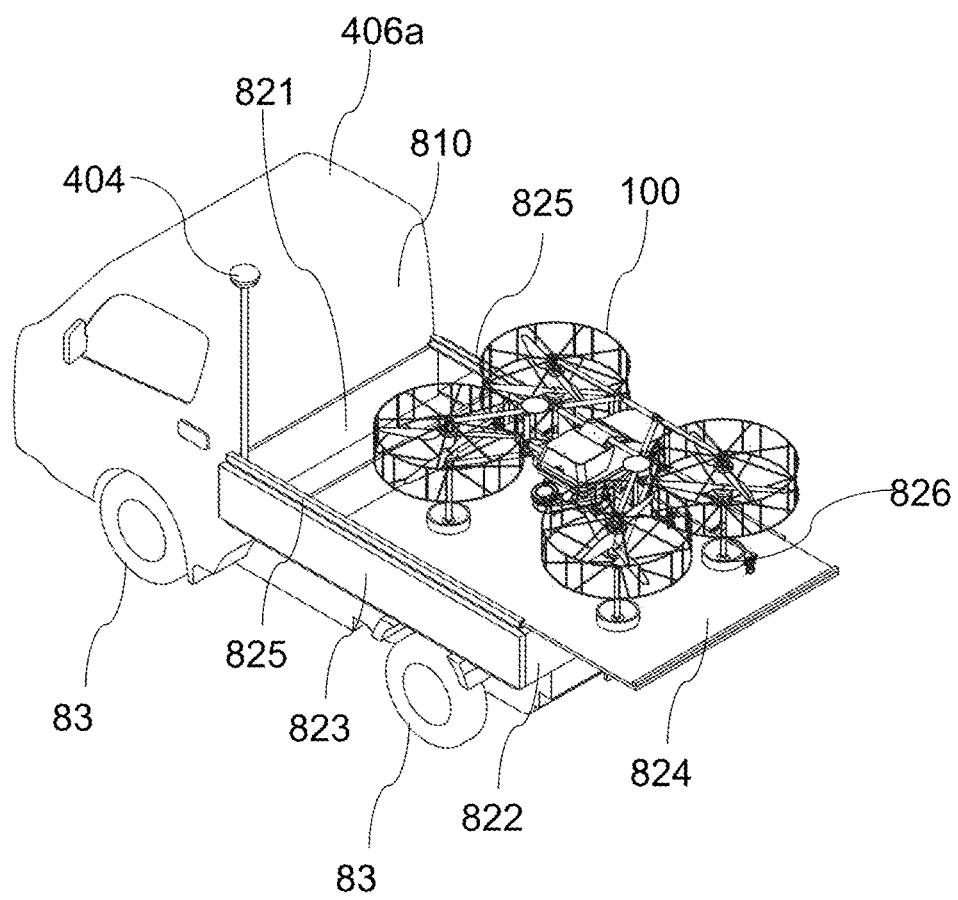
FIG. 28 is a perspective view of the movable body according to the first embodiment of the present invention in FIG. 9 as viewed from another angle. The configuration on the top plate of the movable body mentioned above is appropriately omitted.

The top plate 824 is provided with four leg receivers 826 able to fix legs 107-1, 107-2, 107-3, 107-4 of the drone 100 (see FIG. 27). The leg receivers 826 are, for example, disk shaped members having upper surfaces, recessed in truncated cone shapes, and are disposed one by one at positions corresponding to the four legs 107-1, 107-2, 107-3, 107-4. Bottoms of the truncated cone shaped recesses of the leg receivers 826 and tips of the legs 107-1, 107-2, 107-3, 107-4 of the drone 100 may have shapes that can be fitted to each other.

When landing on the leg receivers 826, the legs 107-1, 107-2, 107-3, 107-4 of the drone 100 slide along conical surfaces of the leg receivers 826 and the tips of the legs 107-1, 107-2, 107-3, 107-4 are guided to the bottoms of the truncated cones. The drone 100 can be automatically or manually fixed to the leg receivers 826 by an appropriate mechanism, and the drone 100 can be safely transported without excessively shaking or dropping the drone 100 even when the movable body 406a moves with carrying on the drone 100 on it. Further, the movable body 406a is able to detect whether the drone 100 is fixed to the leg receivers 826 by a loading status acquisition unit 322 described later.

On a substantially central part of the top plate 824, a circular guide light 850 is arranged for indicating an approximate position for take-off and landing of the drone 100. The circular guide light 850 is formed of a group of light emitting bodies arranged in a substantially circular shape, and the light emitting bodies can blink individually. In the present embodiment, four large illuminants 850a, arranged at about 90 degrees intervals on a circumference, and two small illuminants 850b, arranged at equal intervals between each of the large illuminants 850a, form one circular guide light 850. The circular guide light 850 indicates a flight direction of the drone after take-off or a flying direction for landing by lighting one or a plurality of the illuminants 850a, 850b. The circular guide light 850 may be composed of one annular illuminant that can be partially blinked.

A pair of side plates 823 is connected to the loading platform 82 by hinges and the side plates 823 can swing outward. FIG. 9 illustrates a state that the side plate 823 on a left side in the traveling direction swing outward.

When the side plate 823 swings outward, storage items can be stored in and taken out from the side of the movable body 406a. The side plate 823 is fixed substantially parallel to a bottom surface of the cargo compartment 821, and the side plate 823 can also be used as a workbench.

A pair of the rails 825 constitute a mode switching mechanism. Further,

The hinges connecting the side plates 823 and the loading platform 82 may be included in the mode switching mechanism. The movable body 406a moves in a mode in which the top plate 824 is arranged to cover an upper region of the cargo compartment 821 and the side plates 823 stands up to cover the sides of the cargo compartment 821. When the movable body 406a is inactive, the mode is switched to a mode that the top plate 824 is sliding backward or a mode that the side plates 823 swing outward, and the user 402 can approach inside of the cargo compartment 821.

The drone 100 can supply the battery 502 while landing at the take-off and landing point 406. Supplying the battery 502 includes charging the built-in battery 502 and replacing the battery 502. A charging device of the battery 502 is stored in the cargo compartment 821, and the battery 502 stored in the cargo compartment 821 can be charged. Further, the drone 100 may be provided with an ultracapacitor mechanism instead of the battery 502, and a charger for the ultracapacitor may be stored in the cargo compartment 821. In this configuration, the battery 502 mounted on the drone 100 can be quickly charged through legs of the drone 100 while the drone 100 is fixed to the leg receiver 826.

The drone 100 can refill the chemicals stored in the chemical tank 104 while landing at the take-off and landing point 406. The cargo compartment 821 may store an appropriate components to dilute and mix, such as a dilution mixing tank to dilute and mix the chemicals, a mixing mechanism, and a pump and a hose to suck up the chemicals from the dilution mixing tank and inject into the chemical tank 104. Further, a refilling hose, extending from the cargo compartment 821 to the top plate 824 and connectable to an injection port of the chemical tank 104, may be plumbed.

Waste liquid grooves 840 and waste liquid holes 841 to induce the chemicals discharged from the chemical tank 104 are formed on an upper surface side of the top plate 824. Two waste liquid grooves 840 and two waste liquid holes 841 are arranged, and the waste liquid grooves 840 are located below a chemical nozzle 103 regardless of whether the drone 100 faces the left or right side of the movable body 406a. The waste liquid grooves 840 are grooves having predetermined widths formed substantially straight along a length direction of the movable body 406a and along a position of the chemical nozzle 103, and are slightly inclined toward a side of the passenger seat 81. At ends of the sides of the passenger seat 81 of the waste liquid grooves 840, the waste liquid holes 841 are formed to respectively penetrate the top plate 824 and induce the chemicals inside of the cargo compartment 821. The waste liquid holes 841 are communicating to a liquid waste tank 842 provided inside of the cargo compartment 821 and at substantially directly below the waste liquid holes 841.

When injecting the chemicals into the chemical tank 104, an air bleeding operation is performed to discharge gas, mainly air, filling the chemical tank 104 to an outside. At this time, an operation to discharge the chemicals from a discharging port of the chemical tank 104 is required. Further, an operation to discharge the chemicals from the chemical tank 104 is required after an end of the operation of the drone 100. According to a structure in which the waster liquid grooves 840 and the waste liquid pokes 841 are formed on the top plate 824, waste liquid can be induced to the waste liquid tank 842 and the chemicals can be injected and discharged safely when the chemicals are injected from and discharged to the chemical tank 104 with the drone 100 arranged on the top plate 824.

Over View of Functional Blocks of Movable Body and Drone

As illustrated in FIG. 10, the movable body 406a includes a movement controller 30 as a configuration for the movable body 406a itself to move. Further, the movable body 406a includes a movable body transmitter 31, an intervention operation unit 35, and an input unit 36 as a configuration for acquiring information related to the movable body 406a. In addition, a position acquisition unit 311a, a direction acquisition unit 311b, an angle acquisition unit, and an operation status acquisition unit 323, included in the movable body transmitter 31, constitute a movement detector 310.

Figure 11:
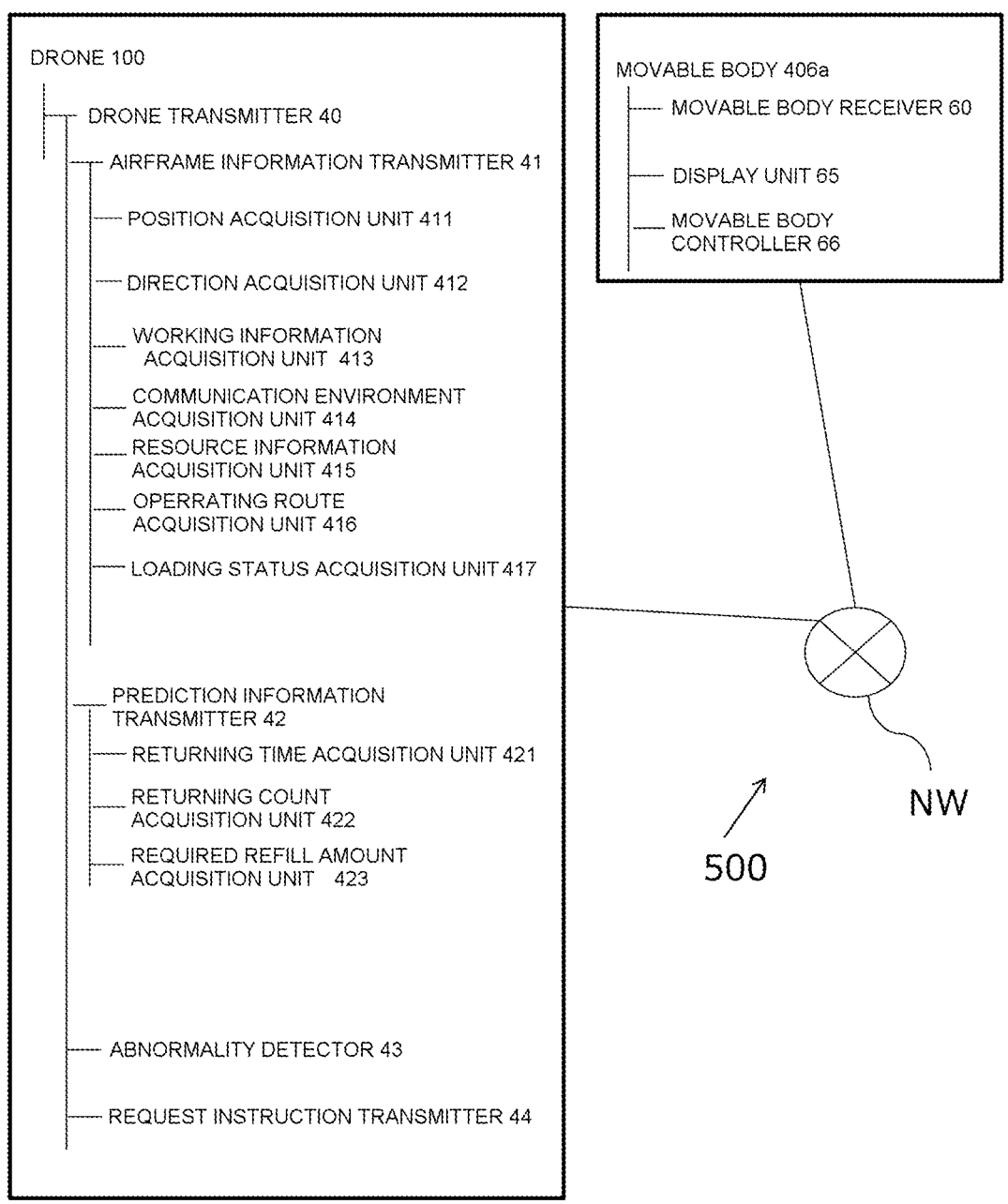
FIG. 11 is a functional block diagram of the drone mentioned above and the movable body mentioned above with respect to operations of transmitting an information from the drone mentioned above and receiving by the movable body mentioned above.

Further, as illustrated in FIG. 11, the movable body 406a includes a movable body receiver 60, display unit 65, and a movable body controller 66, as a configuration for receiving an information related to the drone 100 from the drone 100, making an appropriate decision based on the information, and notifying a necessary information to the user 402.

In addition, as illustrated in FIG. 10, the drone 100 includes the flight controller 21 which is able to autonomously control the flight of the drone 100. The drone includes a drone receiver 20 as a configuration for receiving an information from the movable body 406a. Further, as illustrated in FIG. 11, the drone 100 includes a drone transmitter 40 as a configuration for acquiring the information related to the drone 100 and transmitting to the movable body 406a.

Functional Blocks of Movable Body

As illustrated in FIG. 10, the movable body transmitter 31 includes a landing information transmitter 311, a movable body status transmitter 32, and a resource information transmitter 33.

The landing information transmitter 311 is a functional unit transmitting an information required for the drone 100 to land at the take-off and landing point 406 on the movable body 406a to the drone receiver 20 of the drone 100. The landing information transmitter 311 includes the position acquisition unit 311a, the direction acquisition unit 311b, the angle acquisition unit 311c, and a peripheral environment acquisition unit 311d. The landing information transmitter 311 transmits each of following information acquired by the position acquisition unit 311a, the direction acquisition unit 311b, the angle acquisition unit 311c, and the peripheral environment acquisition unit 311d, to the drone receiver 20.

The position acquisition unit 311a is a functional unit acquiring position coordinates of the take-off and landing point 406. The position coordinates are three-dimensional coordinates. The take-off and landing point 406 is current position coordinates of the movable body 406a when the movable body 406a is inactive. When the movable body 406a is moving, it may be coordinates indicating a scheduled arrival position of the take-off and landing point 406 where the drone 100 reaches a predetermined range in a vicinity of the take-off and landing point 406.

The direction acquisition unit 311b is a functional unit acquiring a direction of the movable body 406a. In detecting the direction of the movable body 406a, values of a geomagnetic sensor of the movable body 406a may be referred to.

The angle acquisition unit is a functional unit acquiring a roll angle and a pitch angle of the movable body 406a.

The position, the direction, and the angle of the movable body 406a may be able to acquire over-time changes. The position acquisition unit 311a, the direction acquisition unit 311b, and the angle acquisition unit 311c, and the operation status acquisition unit 323, described later, constitute the movement detector 310 detecting a movement of the movable body 406a. The movement detector 310 can detect movements due to disturbances such as earthquakes, sliding down slopes, and vehicle collisions, in addition to movements that the movable body 406a automatically or manually changes position by the movement controller 30 based on the over-time changes of the position, the direction, and the angle of the movable body 406a. The movement detector 310 can distinguish and determine whether the movable body 406a is automatically or manually moved or moved due to the disturbances based on the information that the movement detector 310 acquires and the information that the movement controller 30 acquires. When the movement detector 310 detects the movements due to the disturbance, the display unit 65 may indicate that effect. According to this configuration, safety can be ensured more than a configuration in which only movements of the movement controller 30 are detected.

The peripheral environment acquisition unit 311d is a functional unit for acquiring information related to a peripheral environment which may become an obstacle when the drone 100 is landing on the take-off and landing point 406, for example, acquiring a strength and a direction of a wind, and a presence or absence of precipitation such as rain or snow. Further, when the take-off and landing point 406 is shaking, the peripheral environment acquisition unit 311d acquires the information. The shaking of the take-off and landing point 406 may be an earthquake or a vibration generated in a vicinity of a busy road. The shaking of the take-off and landing point 406 can be measured by a six-axis gyro sensor included in the movable body 406a. Further, the peripheral environment acquisition unit 311d may acquire a satellite information communicated by RTK-GPS, a communication state, and a geomagnetic information. The drone 100 receiving the information from the peripheral environment acquisition unit 311d determines whether to land or not based on the information on the peripheral environment.

Furthermore, the peripheral environment acquisition unit 311d detects obstacles existing around the movable body 406a as one of the information related to the peripheral environment. The obstacles includes structures, for example, houses, guardrails, electric wires and the like, and creatures such as people and animals, and movable bodies, such as vehicles and the like, which are in danger of collision for the drone 100 for landing. The peripheral environment acquisition unit 311d includes a camera using visible light or infrared light, and detects the obstacles around the movable body 406a. Further, a detection of the obstacles may be performed by using RADAR/LiDAR instead of or in addition to the camera, for example, an obstacle detection system generally provided in an automobile, which is an example of the movable body 406a, can be used. According to this configuration, information on obstacles that the drone 100 cannot detect can be transmitted to the drone 100. Therefore, a risk for the drone 100 to collide with an obstacle can be further reduced.

A landing information transmitter 311 determines whether the drone 100 can safely land based on at least one of acquired information by the position acquisition unit 311a, the direction acquisition unit 311b, the angle acquisition unit 311c, and a peripheral environment acquisition unit 311, and transmit a determination result to the drone receiver 20. The determination may be performed by the flight controller 21 of the drone 100.

The movable body status transmitter 32 is a functional unit for transmitting a status of the movable body 406a to the drone receiver 20. The movable body status transmitter 32 acquires information on whether the movable body 406a is in a status to function as the take-off and landing point 406 in particular and transmits to the drone receiver 20. The function as the take-off and landing point 406 includes an ability of the drone 100 to take off from and land on the top plate 824, an ability of supplying the battery 502 and refilling the chemicals of the drone 100, and the like.

The movable body status transmitter 32 includes a mode acquisition unit 321, the loading status acquisition unit 322, the operation status acquisition unit 323, a working status acquisition unit 324, and a system status acquisition unit 325. The movable body status transmitter 32 transmits each of the following information acquired by the mode acquisition unit 321, the loading status acquisition unit 322, the operation status acquisition unit 323, the working status acquisition unit 324, and the system status acquisition unit 325, to the drone receiver 20.

The mode acquisition unit 321 is a functional unit for acquiring a mode of the movable body 406a. The movable body 406a can switch to at least a traveling mode in which the movable body 406a moves and a take-off and landing base mode in which the drone 100 takes off from and lands on the movable body 406a by the above described mode switching mechanism. In addition, in the present embodiment, it is also possible to switch to a workbench mode in which the sideplate 823 is swung outward. The mode acquisition unit 321 acquires information on whether the movable body is in the traveling mode, the take-off and landing base mode, or the workbench mode. The mode acquisition unit 321 may acquire the mode of the movable body 406a based on a driving state of appropriate configuration of the mode switching mechanism, such as a motor driving a rack and pinion mechanism of the rails 825. In addition, the mode acquisition unit 321 may include a configuration to mechanically detect the mode of the movable body 406a, such as a touch switch and the like.

In the workbench mode, it is highly probable that the user 402 is in a vicinity of the movable body 406a, so that the drone 100 cannot take off and land. Therefore, the movable body transmitter 31 transmits a signal to prohibit the take-off and landing or a signal to allow the take-off and landing of the drone 100 to the drone receiver 20, and thereby safety for the user 402 is ensured.

The mode of the movable body 406a acquired from the mode acquisition unit 321 is transmitted to the drone receiver 20 through the movable body transmitter 31. The flight controller 21 of the drone 100 may be configured to determine a landing position of the drone 100 based on the mode of the movable body 406a. When the movable body 406a is in the take-off and landing base mode, the flight controller 21 determines to land on the take-off and landing point 406 of the movable body 406a. When the movable body 406a is in the traveling mode or the workbench mode, the flight controller 21 determines that landing to the take-off and landing point 406 is impossible. In this case, the drone transmitter 40 may transmit an instruction requesting the movable body 406a to switch to the take-off and landing base mode. In addition, when the movable body 406a cannot switch to the take-off and landing base mode, a point different from the take-off and landing point 406 may be determined for landing. For example, a ground corresponding to a point where the drone 100 has taken off may be determined for landing. Since the take-off point has a record of taking off, there is a high probability of being able to land. Further, it may also be determined to land the drone 100 at a predetermined point in the farm field where the drone is operating. The point in the farm field has a higher probability of being able to land safely since the farm field is easier to grasp geographical features than the points outside of the farm field and is less likely to interfere with passerby and vehicles.

The loading status acquisition unit 322 is a functional unit acquiring information on whether the drone 100 is loaded on the take-off and landing point 406. In addition, the loading status acquisition unit 322 can acquire information on whether the drone 100 is fixed to the take-off and landing point 406 and the movable body 406a is in a state to be able to move safely. The loading status acquisition unit 322 determines whether the movement of the movable body 406a is allowed or prohibited based on whether the movable body 406a is in the state to be able to move safely, and may transmit the determination result to the user 402 through the display unit 65. According to the configuration in which the loading status acquisition unit 322 is provided in the movable body 406a, a loading state can be grasped even when the power of the drone 100 is not turned on. When the drone 100 is loaded on the movable body 406a to be transported to the vicinity of the farm field before starting operation in the farm field, the power of the drone 100 is turned off at the time of loading. Therefore, it is preferable that the loading status acquisition unit 322 is provided in the movable body 406a.

The operation status acquisition unit 323 acquires an operation information indicating whether the movable body 406a is traveling or a movable status. Further, the operation status acquisition unit 323 can acquire a more detailed operation status of the movable body 406a by distinguishing whether the movable body 406a is moving or is stopping but in a movable idling status. The operation status acquisition unit 323 can acquire a more detailed operation status when the movable body 406a cannot move, and may acquire information indicating that operating in the workbench mode or changing the mode in progress based on the information from the mode acquisition unit 321 in addition to the information indicating that stopping.

The working status acquisition unit 324 is a functional unit for acquiring a status of the battery 502 and the chemicals for supplying to the drone 100. The working status acquisition unit 324 transmits a battery supplemental information indicating a status of supplying operation toward the battery 502 to the drone receiver 20. The battery supplemental information includes information on whether the movable body 406a is currently charging the battery 502 in the cargo compartment 821, and information indicating on whether the battery 502 is being prepared in the cargo compartment 821 of the movable body 406a, the battery 502 is being replaced on the movable body 406a, or the replacement is competed. The working status acquisition unit 324 transmits a chemical refilling information indicating a status of refilling operation of the chemicals to the drone receiver 20. The chemical refilling information includes information indicating on whether the chemicals are being prepared in the cargo compartment 821, the chemicals are being refilled on the movable body 406a, or the refill is completed. In addition, the chemical refilling information includes information indicating a progress of dilution and mixing of the chemicals in or near the cargo compartment 821.

The system status acquisition unit 325 is a functional unit for acquiring information of a status of a system of the movable body 406a (hereinafter, also referred to as "system status"). The information of the system status includes information on a presence or an absence of abnormalities of the movable body 406a, and a presence or an absence of abnormalities of the base station 404. In this description, the "abnormalities" of the drone 100, the base station 404, and the movable body 406a include not only an abnormal external environment but also internal failures.

The abnormalities of the movable body 406a include information on whether the drone 100 should immediately return based on contents of the abnormality occurring. When the abnormality of the movable body 406a is minor or an abnormality that does not significantly affect the operation of the drone 100, it may not be necessary to return the drone 100. The abnormality that requires the drone to return may be a case in which a fuel of the movable body 406a falls below a predetermined level. The information of the system status includes a remaining amount of a drive energy capacity of the drive source driving the movable body 406a. When the remaining amount of the fuel for driving the movable body 406a is equal to or less than a predetermined value, the system status acquisition unit 325 can notify that effect. The driving source of the movable body 406a may be any suitable source such as gasoline, electricity, fuel cell, or the like.

The information that an abnormality has occurred in the base station 404 may be transmitted to the drone receiver 20 from the movable body transmitter 31, or may be transmitted to the drone receiver 20 from the base station 404 without going through the movable body transmitter 31.

The resource information transmitter 33 is a functional unit for transmitting a resource information, indicating an amount of resources prepared in the movable body 406a which is possible to supply the drone 100, to the drone receiver 20. The resource information includes a number of charged batteries 502 and an amount of the chemicals. In addition, the resource information may be a charging capacity of an equipment for charging the batteries 502. When the drone 100 is driven by the fuel cell, an amount of fuel gas, for example, hydrogen gas, that can be stored in the drone 100, may be the resource information. The amount of the resources prepared in the movable body 406a can be acquired manually by an input of the user 402 or may be acquired automatically. As an example for automatically acquiring, a configuration for measuring an amount of a predetermined range of the cargo compartment 821 may be provided to acquire the amount of the chemicals. Further, in order to acquire numbers of used batteries 502, a configuration for measuring capacities of the batteries 502 may be provided in addition to the amount of the predetermined range of the cargo compartment 821.

The intervention operation unit 35 is a functional unit for transmitting an instruction of the drone 100 to the drone receiver 20. The drone 100 normally operates autonomously by the flight controller 21 of the drone 100, but when an abnormality occurs in the drone 100, instructions from the movable body 406a may intervene to operate the drone 100. Instructions from the user 402 can also be transmitted to the drone 100 through the input unit 36 of the movable body 406a.

In particular, the intervention operation unit 35 can transmit instructions to the drone 100 that the user 402 performs an retreat action to stop the operation of the drone 100. The retreat action includes a normal landing action, an aerial stop such as hovering, an immediate movement to a predetermined returning point by the shortest route, and an "emergency return" in addition to an action to return to the take-off and landing point 406.

In addition, the retreat action may be a "normal return" that moves to a predetermined returning point by an optimized route. The optimized route is a route calculated by referring a route where the chemicals are sprayed before receiving an instruction for the normal return. For example, it is the take-off and landing point 406. In the normal return, the drone 100 may move to the predetermined returning point while spraying the chemicals via route that has not been sprayed with the chemicals. Furthermore, the retreat action includes an "emergency stop" in which all of the rotor blades are stopped and the drone 100 is dropped downwards from the spot.

When the movement detector 310 detects movements of the movable body 406a, the intervention operation unit 35 may transmit an instruction to the drone 100 to perform the retreat action. The retreat action in this case is specifically hovering. When the movable body 406a moves, an operation of the drone 100 is stopped to ensure safety since it is unclear whether the drone 100 can continue to operate safely. At the same time, the movable body controller 66 notifies a warning through the display unit 65 and requests the movable body 406a to return to the original position. In order to return the movable body 406a to the original position, the display unit 65 may indicate a route for guiding.

The intervention operation unit 35 may generate an operating route of the drone 100 between a point where the drone exists, or an entering and exiting point where the drone 100 exits from the farm field, and the take-off and landing point 406.

Furthermore, the intervention operation unit 35 may be capable of transmitting signals for individually operating three-dimensional position coordinates, speed, acceleration, and a nose direction of the drone 100. The intervention operation unit 35 may start controlling the flight of the drone 100 upon receiving the abnormality information from the drone 100.

The input unit 36 is a functional unit for receiving an input from the user 402. The input unit 36 can input an instruction to start the flight of the drone 100, and an instruction to return the drone 100 to the take-off and landing point 406. The input unit 36 may a tablet having the same mechanism as the display unit 65.

As illustrated in FIG. 11, the movable body 406a further includes the movable body receiver 60, the display unit 65, and the movable body controller 66.

The movable body receiver 60 is a functional unit for receiving information from the drone transmitter 40. The information that the movable body receiver 60 receives will be described later with the description of the functional block of the drone 100.

The display unit 65 is a functional unit for appropriately indicating information to be transmitted to the user 402.

The movable body controller 66 is a functional unit to determine operations of the movable body 406a based on the information received from the movable body receiver 60. The operations of the movable body 406a includes an operation of determining whether a notification to the user 402 is required, and an operation of changing modes of the movable body 406a. In addition, the operations of the movable body 406a includes an operation of moving the position of the movable body 406a by using the movement controller 30. The details of the operations of the movable body controller 66 will be described later with descriptions of the information that the movable body receiver 60 receives and functional blocks of the drone 100.

Functional Blocks of Drone

As illustrated in FIG. 11, the drone transmitter 40 includes an airframe information transmitter 41, a prediction information transmitter 42, an abnormality detector 43, and a request instruction transmitter 44. The information from the drone transmitter 40 includes information that can distinguish whether the drone 100 is in flight. The information transmitted from the drone transmitter 40 may be transmitted periodically, or may be transmitted as a trigger at a start of flight, and at a start of landing or a predetermined time before the start of landing.

The airframe information transmitter 41 is a functional unit for transmitting information related to a current state of the drone 100 to the movable body receiver 60. The airframe information transmitter 41 includes a position acquisition unit 411, an direction acquisition unit 412, a working information acquisition unit 413, a communication environment acquisition unit 414, a resource information acquisition unit 415, an operating route acquisition unit 416, and a peripheral environment acquisition unit 417.

The position acquisition unit 411 is a functional unit for acquiring the three-dimensional position coordinates of the drone 100. The three-dimensional position coordinates is acquired based on information of RTK-GPS. According to this configuration, the current position of the drone 100 can be indicated on the display unit 65. In addition, it is possible to acquire three-dimensional coordinates of the drone 100 while the drone 100 is landing at the take-off and landing point 406 and store the coordinates in the drone 100 itself and the movable body 406a as coordinates that can be landed. The drone 100 may be configured to determine the landing position based on the three-dimensional coordinates of the drone 100 at the time of landing. According to this configuration, it is not necessary to include the configuration of RTK-GPS on the movable body 406a and the configuration can be simple and inexpensive since the position coordinates of the take-off and landing point 406 acquired for landing can be acquired by the configuration of the drone 100. Furthermore, the movable body controller 66 can guide the movable body 406a so that the drone 100 can return based on the coordinates when the drone 100 is landing. In a guidance of the movable body 406a, the user 402 may be notified of an instruction to perform an operation history in a reverse order based on the operation history of the steering wheel and tires to the user 402 other than a condition to lay over and indicate target coordinates points on a map or an actual landscape.

The configuration in which the movable body 406a is moved by the user 402 who receives the guidance can be configured at a lower cost than the configuration in which the movable body 406a itself moves by automatic operation. In order to operate the movable body 406a automatically, for example, it is necessary to mount a position measuring device having a higher accuracy than a GPS (GNSS) mounted on an existing automobile, for example, a position measuring device using an RTK-GPS, on the movable body 406a, which increases costs.

The direction acquisition unit 412 is a functional unit for acquiring a nose direction of the drone 100. The nose direction is acquired by referring to a value of the geomagnetic sensor mounted on the drone 100 or a value of a GPS compass.

The working information acquisition unit 413 is a functional unit for acquiring information on the operation status performed by the drone 100. The operation status of the drone 100 includes status during taking off, landing, and waiting for hovering. In addition, the operation status includes status when the drone 100 is entering the farm field and the status where the drone 100 is flying outside of the farm field. Furthermore, the operation status includes statuses in which the drone 100 is performing and is not performing the chemical spraying or monitoring. The information on the operation status may be appropriately indicated through the display unit 65. According to this configuration, the user 402 can know the status of the autonomously operating drone 100 in substantially real time, and gives the user 402 a sense of security.

The movable body controller 66 restricts movement of the movable body 406a by the movement controller 30 when the drone 100 is determined to be in flight based on the information acquired by the working information acquisition unit 413. A restriction of the movement may be a prohibition of the movement or a restriction that allows only movement within a predetermined range. When prohibiting movement, the configuration may be prohibiting to release of a P shift or prohibiting to release of a side break. Since the P shift and the side break release prohibition mechanism are often installed in existing automobiles, a separate device may not be necessary when the existing automobile is modified to configurate the movable body of the present invention. In other words, the movable body according to the present invention can be realized at low cost. Furthermore, when the drone 100 is determined to be in flight, the display unit 65 indicates differently from the case where the drone 100 is not in flight. The display unit 65 may indicate to that effect at all times while the drone 100 is in flight. Further, the display unit 65 may notify a warning when the user 402 inputs an instruction to move the movable body 406a during the flight of the drone 100.

The movable body controller 66 retains the movable body 406a in a mode where the drone 100 can take-off and land by operate the mode switching mechanism or restrict operation. The movable body controller 66 may mechanically lock the mode switching mechanism, or may restrict electrical connections so that the mode cannot be switched. Further, the movable body controller 66 may indicate on the display unit 65 that the mode cannot be switched. The indication may be indicated at all times while the drone 100 is in flight, or indicated when the user 402 inputs an operation for switching the form.

The communication environment acquisition unit 414 is a functional unit for acquiring a status of communication with the satellite and communication with the movable body 406a and configurations of other drone system 500.

The resource information acquisition unit 415 is a functional unit for acquiring an amount of resources prepared in the drone 100, such as a remaining amount of the battery 502 (see FIG. 7) and a remaining amount of the chemical tank 104. By acquiring the remaining amount of the battery 502 of the drone 100, the drone 100 or the movable body 406a can predict a flyable range that the drone 100 can fly with the remaining amount. The movable body controller 66 may specify a range that the movable body 406a can move and restrict the movement of the movable body 406a outside of the flyable range based on the flyable range of the drone 100. According to this configuration, the movable body 406a can be retained in a range where the drone 100 can return, and a safe return of the drone 100 can be guaranteed. Further, the resource information acquisition unit 415 may determines whether the movable body 406a is in the flyable range of the drone 100. When the movable body 406a is moved and does not exist within the flyable range of the drone 100, the flight controller 21 may land the drone 100 to a point where the drone 100 has taken off. Further, in this case, the flight controller 21 may hover or land the drone 100 at a predetermined point. The predetermined point may be a point where the drone 100 exists, the exiting point where the drone 100 exits from the farm field, and an arbitrary point near the movable body 406a when the movable body 406a deviates from the flyable range. According to the configuration of landing at the exiting point where the drone 100 exits from the farm field, the user 402 can easily approach the drone 100 without entering the farm field, as compared with the configuration of landing at a point where an operation in the farm field is interrupted.

The operating route acquisition unit 416 is a functional unit for acquiring information of a predetermined operating route of the drone 100 in the farm field. The drone 100 flies in the farm field based on the information of the operating route and performs a predetermined operation such as monitoring and spraying the chemicals. Further, the operating route acquisition unit 416 may acquire an information of a take-off and landing route between an entering and exiting point where the drone 100 enters the farm field and the take-off and landing point 406, and may transmit to the movable body 406a through the drone transmitter 40.

The loading status acquisition unit 417 is a functional unit for acquiring information whether the drone 100 is loaded on the movable body 406a. Further, the loading status acquisition unit 417 may acquire a loading information indicating whether the drone 100 is loaded on the take-off and landing point 406 of the movable body 406a and the movable body 406a can be safely moved. The loading status acquisition unit 417 may transmit a signal to the movable body 406a through the drone transmitter 40 to allow the movable body 406a to move when the drone 100 is safely fixed. In addition, the loading status acquisition unit 417 may transmit a signal to the movable body 406a through the drone transmitter 40 to not allow the movable body 406a to move when the drone 100 is not fixed.

The prediction information transmitter 42 is a functional unit for predicting information on refilling of the resources performed by the drone 100 returning to the take-off and landing point 406 and transmitting to the movable body receiver 60. The prediction information transmitter 42 includes a returning time acquisition unit 421, a returning count acquisition unit 422, and a required refill amount acquisition unit 423.

The returning time acquisition unit 421 is a functional unit for calculating a time required from a start of an operation to an operation interruption point that the drone 100 returns to the take-off and landing point 406 for refilling the resources when the drone 100 completes the operation on a scheduled operation route within a predetermined target area, such as the farm field. The returning time acquisition unit 421 may refer to the required time and a current time and acquire a scheduled time to interrupt the operation and a scheduled time that the drone 100 returns to the take-off and landing point 406.

The returning count acquisition unit 422 is a functional unit for acquiring a scheduled count that the drone 100 returns to the take-off and landing point 406 for refilling the resources.

The required refill amount acquisition unit 423 is a functional unit for acquiring an amount of resources that is required to refill the drone 100. The amount of the resources that is required is, for example, numbers of charged batteries and an amount of the chemicals. The numbers of the charged batteries can be calculated in consideration of a length of a scheduled operation route, an actual value of a past power consumption and the like. The amount of the chemicals can be calculated based on a total area of the farm field and a spray concentration determined according to a type of chemicals.

The abnormality detector 43 is a functional unit for detecting an abnormality occurring in the drone 100 and transmitting to the movable body receiver 60 through the drone transmitter 40. When the drone 100 has an abnormality, the drone 100 returns to the take-off and landing point 406. When the movable body controller 66 receives the abnormality of the drone 100, the movable body controller 66 determines whether the drone 100 is in a returnable position and returnable mode based on the information from the abnormality detector 43, and changes the position or the mode if necessary. In addition, the movable body controller 66 notifies the user 402 to change the position or the mode through the display unit 65. Further, the movable body controller 66 notifies the user 402 to move away a predetermined distance or more from the movable body 406a.

The request instruction transmitter 44 is a functional unit for transmitting a request instruction regarding a status of the movable body 406a to the movable body receiver 60. In particular, the request instruction transmitter 44 may transmit a request to the movable body receiver 60 to make the position, the direction, and the mode of the movable body 406a to be landed when the drone 100 is scheduled to return. The movable body controller 66 may automatically change to the status to be landed based on the request, or may notify the user 402 to guide the user 402 to the status to be landed. Further, the request instruction transmitter 44 may transmit an instruction to prohibit the movement of the movable body 406a and an instruction to prohibit to change the mode of the movable body 406a when the movable body 406a is in the status that can be landed.

Flow Charts of Drone Landing on Take-Off and Landing Point on Movable Body

Figure 12:
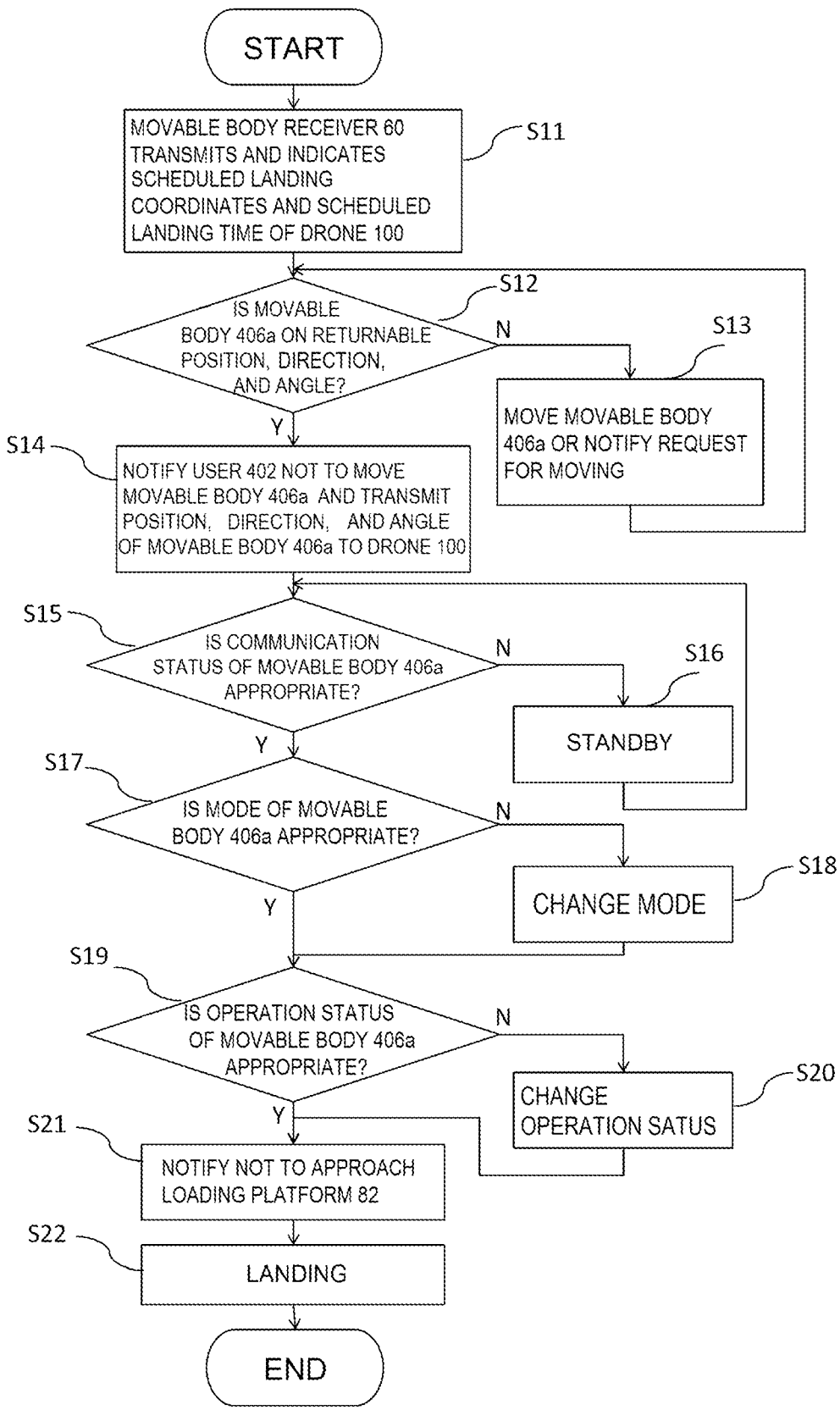
FIG. 12 is a flow chart illustrating a flow of the drone mentioned above landing at a take-off and landing point on the movable body mentioned above.

As illustrated in FIG. 12, the movable body receiver 60 receives scheduled landing coordinates, a nose direction, and a scheduled landing time of the drone 100 from the airframe information transmitter 41 and the prediction information transmitter 42 (S11).

The movable body controller 66 determines whether the position, the direction and the angle of the movable body 406a is in a returnable range for the drone (S12). If it is not returnable, the movable body controller 66 drives the movement controller 30 to move the movable body 406a in a returnable position, a returnable direction, and a returnable angle for the drone 100 (S13). Alternatively, the movable body controller 66 notifies the user 402 a movement request of the movable body 406a through the display unit 65 and returns to step S12.

When the position, the direction and the angle of the movable body 406a is in the returnable range, the user 402 is notified not to move the movable body 406a through the display unit 65 (S14). Further, the position, the direction, and the angle of the movable body 406a are transmitted to the drone 100.

Subsequently, the movable body controller 66 determines whether a communication status of other configurations on the satellite or the drone system 500, acquired by the peripheral environment acquisition unit 311d, is appropriate (S15). If the communication status is not appropriate, it is on stand-by for a predetermined time (S16). In addition, the user 402 is notified that it is on stand-by due to the communication status. Further, instead of stand-by, the user 402 may be notified of a request to move the position of the movable body 406a. If the movable body 406a is placed near a structure that causes radio interference, or if the position of the satellite as seen from the movable body 406a is misrecognized when communicating with the satellite, moving the movable body 406a is useful.

Then, the movable body controller 66 determines whether the mode of the movable body 406a acquired by the mode acquisition unit 321 is in returnable of the drone 100 (S17). When the mode is not returnable of the drone 100, the movable body controller 66 changes the mode of the drone 100 (S18). In addition, the movable body controller 66 may notify the user 402 through the display unit 65 to change the mode of the movable body 406a.

Then, the movable body controller 66 determines whether the operation status of the movable body 406a is in a status in which the drone 100 can return (S19). If the operation status is not returnable of the drone 100, the movable body controller 66 changes the operation mode (S20). Further, the movable body controller 66 may notify the user 402 through the display unit 65 to change the operation mode of the movable body 406a.

The display unit 65 notifies the user 402 not to approach the loading platform 82 because the drone 100 is scheduled to return (S21). At this time, based on the information acquired by the peripheral environment acquisition unit 311d, it may be configured to issue a landing permit to the drone 100 after confirming that there are no persons or obstacles around the movable body 406a. Upon receiving the landing permit, the drone 100 lands on the take-off and landing point 406 (S22). When there are persons and obstacles around the movable body 406a, the drone 100 may hover at a predetermined point and wait for the person or obstacle to disappear. A hovering point may be in the farm field, may be the exiting port exiting from the farm field, or may be an arbitrary point in a vicinity of the movable body 406a. If it is impossible to land at the take-off and landing point 406 even after hovering and waiting for the predetermined time, the landing may be performed at the hovering point or by moving. According to the configuration in which landing is performed at the exiting point exiting from the farm field, the user 402 can easily approach the drone 100 without entering the farm field, as compared with the configuration in which landing is performed at a point where an operation in the farm field is interrupted.

Flow Chart to Manage Resources that Movable Body has to Refill Drone

Figure 13:
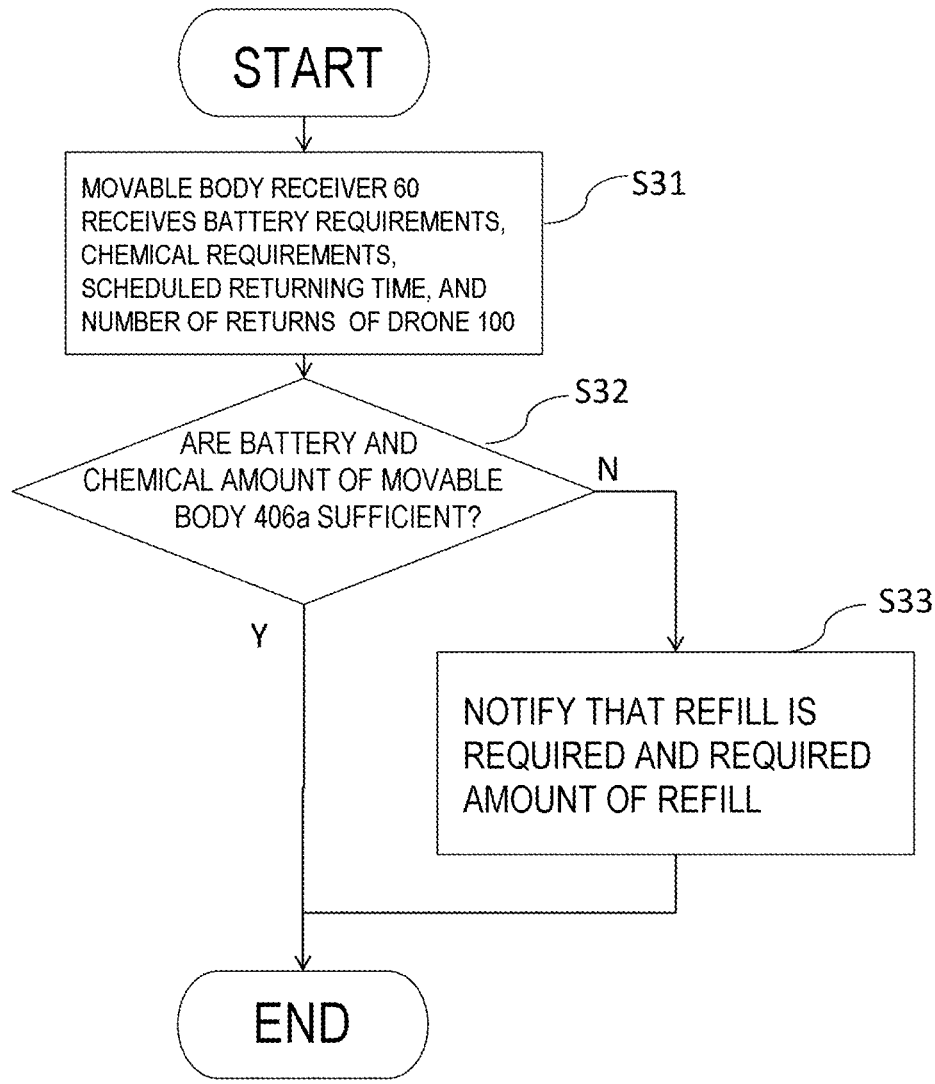
FIG. 13 is a flow chart illustrating allocating an amount of resources held by the movable body mentioned above based on information from the drone mentioned above.

As illustrated in FIG. 13, the movable body receiver 60 receives a number of required batteries 502, a required amount of the chemicals, scheduled returning time, and a number of returns of the drone 100 from the prediction information transmitter 42 of the drone 100 (S31). The movable body controller 66 refers to the amount of the resources acquired by the resource information transmitter 33 and determines whether the number of the batteries 502 and the amount of the chemicals of the movable body 406a are sufficient (S32). If the number of the batteries 502 and the amount of the chemicals of the movable body 406a are not sufficient, the movable body controller 66 notifies the user 402 that it is necessary to refill and the required refill amount (S33). In addition, the movable body controller 66 may notify the user 402 to distinguish an amount required by next return and a total amount required by the end of the operation in the farm field.

Flow Chart when Abnormality Occurs in Drone

Figure 14:
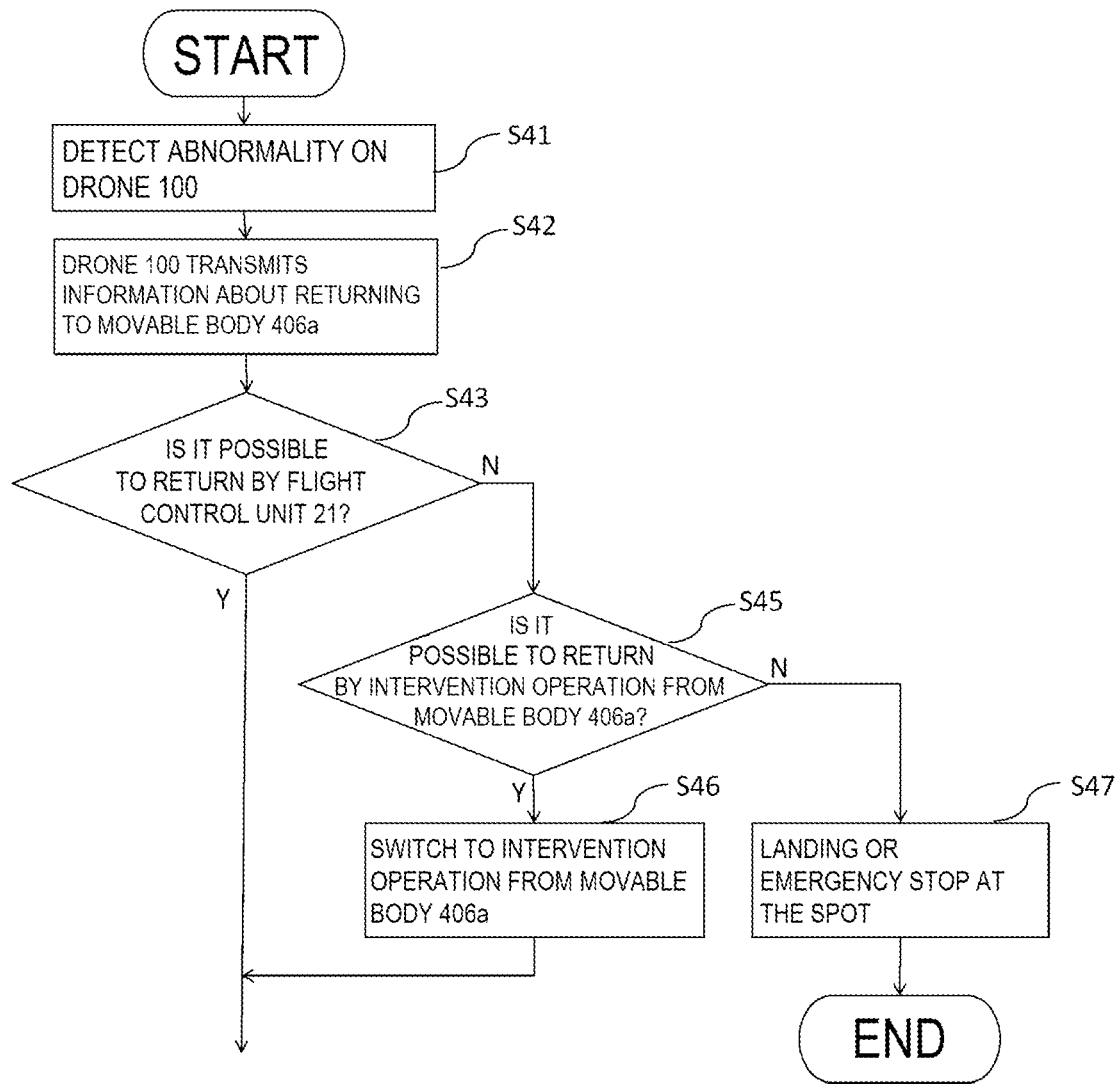
FIG. 14 is a flow chart when an abnormality is detected in the drone mentioned above.

As illustrated in FIG. 14, first, the abnormality detector 43 detects the abnormality (S41). Then, the drone transmitter 40 transmits an information to the movable body receiver 60 that the drone 100 returns to the movable body 406a (S42).

The flight controller 21 of the drone 100 determines whether it is possible to return under a control of the flight controller 21 itself (S43), and if it is possible to return, the return is performed by the flight controller 21 and proceed to step S11 in FIG. 12.

When it is determined that it is not possible to return under the control of the flight controller 21 itself, the movable body controller 66 determines whether the drone 100 is possible to return by an intervention operation performed by the intervention operation unit 35 of the movable body 406a (S45). If it is possible to return, it is switched to the intervention operation from the movable body 406a (S46), and proceed to step S11 in FIG. 12. When it is determined that the return is not possible in step S45, the drone 100 performs an emergency stop such as landing on the spot or stopping the operation of the rotor blades to dropping off on the spot (S47).

Flowchart for Case when Abnormality Occurs in Movable Body

Figure 15:
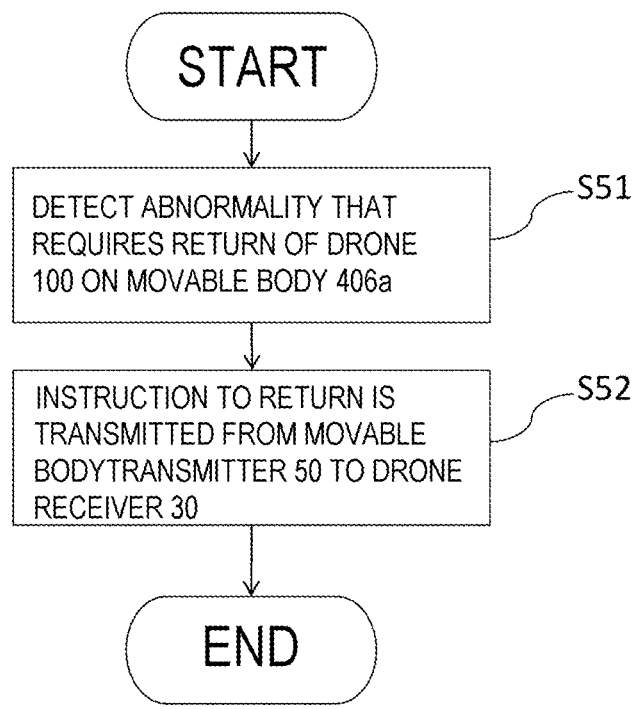
FIG. 15 is a flow chart when an abnormality is detected in the movable body mentioned above.

As illustrated in FIG. 15, first, the system status acquisition unit 325 of the movable body 406a detects that an abnormality requiring the return of the drone 100 has occurred in the movable body 406a (S51). Then, the movable body transmitter 31 transmits an instruction to return the drone 100 to the drone receiver 20 (S52).

Movable Body (2)

Figure 16:
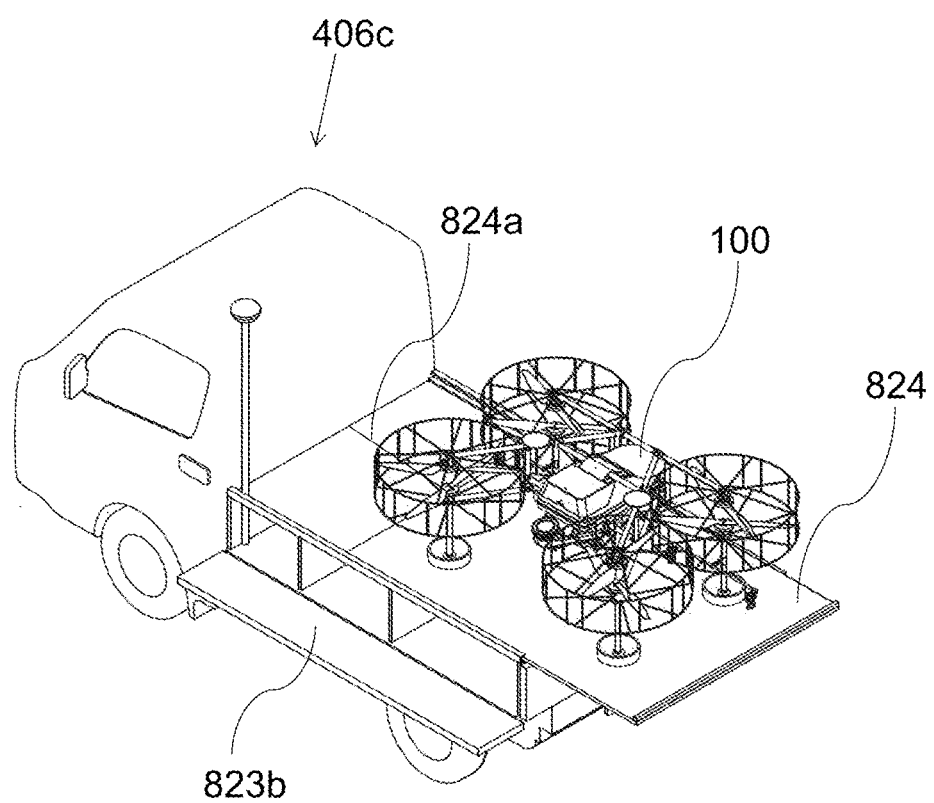
FIG. 16 is an overall conceptual diagram illustrating the second embodiment of the movable body according to the present invention and a state of the drone mentioned above.

The second embodiment of the movable body according to the present invention will be described with reference to FIG. 16 by focusing on parts different from the above described embodiment. Hereinafter, the same reference numerals are given to the same configurations as those of the other embodiments. Further, in each embodiment, the configurations of the groove 840 and the waste liquid hole 841 on the top plate and the waste liquid tank 842 in the cargo compartment 821 and the like are omitted, but the same configuration as the first embodiment may be included.

The movable body 406b of the second embodiment is different from the movable body of the first embodiment in that a second top plate 824b along the top plate 824 is arranged below the top plate 824 to cover inside of the cargo compartment 821. When the top plate 824 is slid backward, the second top plate 824b is exposed. According to this configuration, even if the top plate 824 slides, an upper part of an interior of the cargo compartment 821 is not opened, and loaded contents can be protected. Further, in the movable body 406b, a lower end of a side gate 823b is connected to an end of the cargo compartment 821 by hinges and the gate 823b can be swung and be fixed substantially parallel to the bottom surface of the cargo compartment 821. According to this configuration, the loaded contents inside of the cargo compartment 821 can be approached (reached) and the gate 823b can be used as a workbench.

The second top plate 824b may be configured with a single flat plate or may be configured with a plurality of flat plates. In the present embodiment, the second top plates 824b are configured with two flat plates having substantially same shape and are respectively connected to a support rod arranged substantially in the center of the cargo compartment 821 in the width direction and across the traveling direction. These two flat plates and the support rod are fixed with, for example, hinges, and the loaded contents inside of the cargo compartment 821 can be approached (reached) by respectively rotating the flat plates from the sides of the movable body 406c. In addition, the second top plates 824b may be slidably connected to the rail 825 instead of being rotatable by hinges, and the inside of the cargo compartment 821 may be opened upward by sliding the second top plates backward in the traveling direction.

Movable Body (3)

Figure 17:
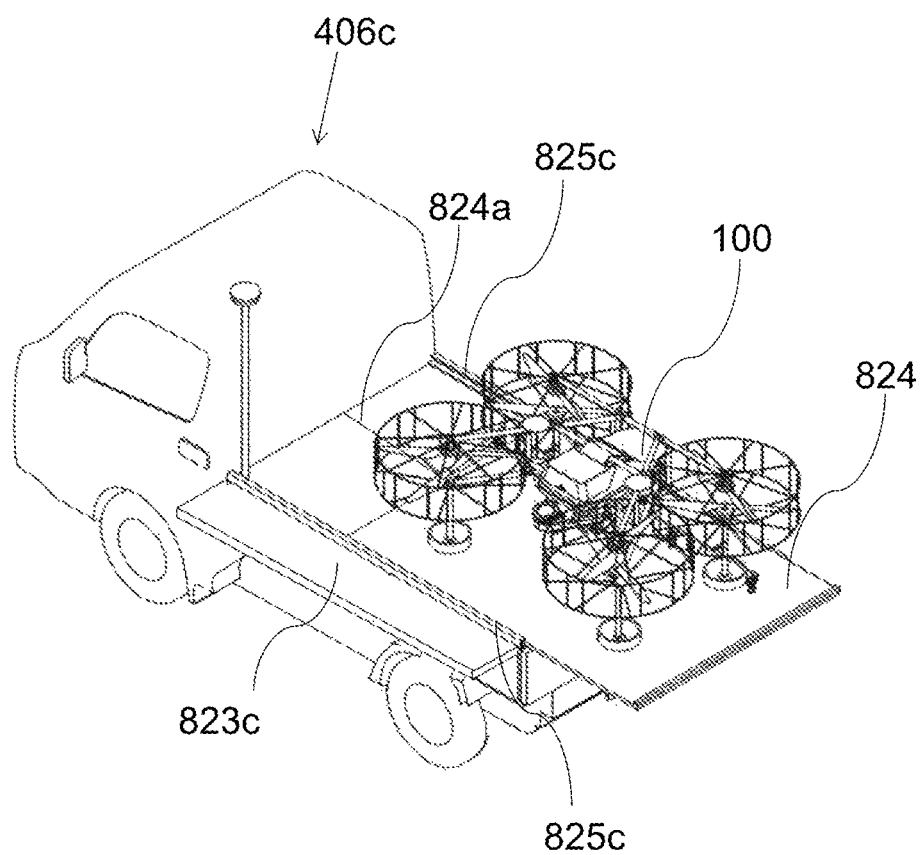
FIG. 17 is an overall conceptual diagram illustrating the third embodiment of the movable body according to the present invention and a state of the drone mentioned above.

The third embodiment of the movable body according to the present invention will be described with reference to FIG. 17 by focusing on parts different from the above described embodiment. The movable body 406c of the third embodiment is different from the movable body of the first embodiment in that an upper end of a side gate 823c is connected to a rail 825c with hinges, and the gate 823c can be rotated to be fixed substantially in parallel on a substantially same plane as the top plate 824. According to this configuration, a landable surface can be expanded by the gate 823c. In the present embodiment, the second top plate 824b is arranged.

Movable Body (4)

Figure 18:
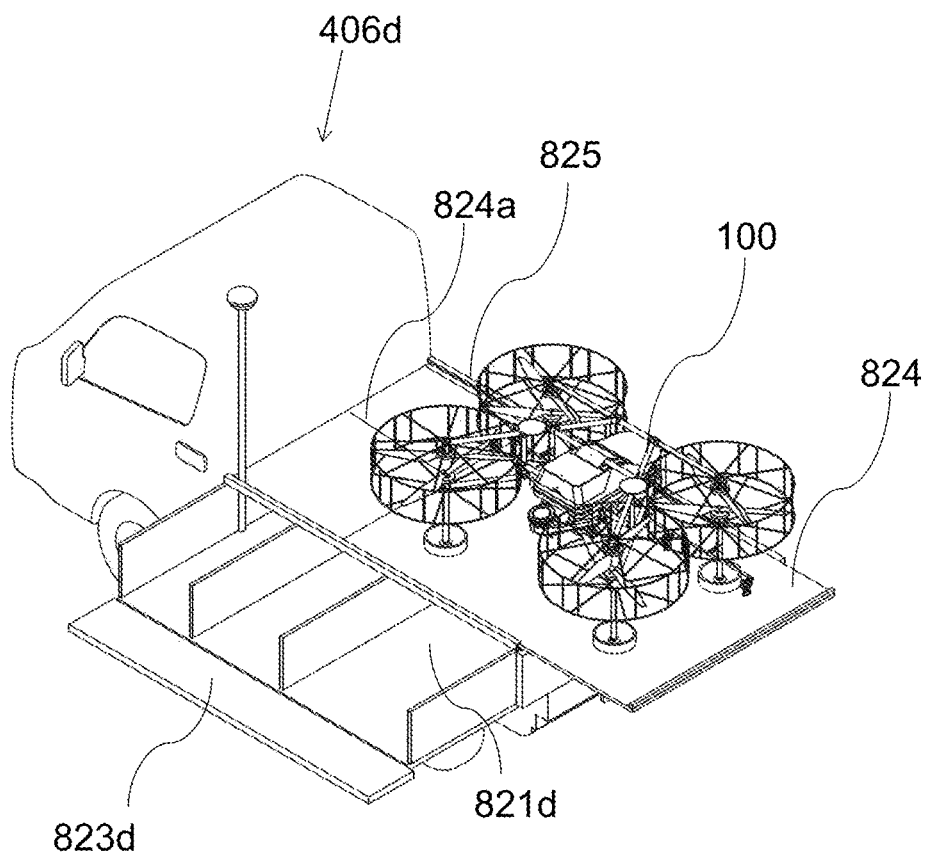
FIG. 18 is an overall conceptual diagram illustrating the fourth embodiment of the movable body according to the present invention and a state of the drone mentioned above.

The fourth embodiment of the movable body according to the present invention will be described with reference to FIG. 18 by focusing on parts different from the above described embodiment. The movable body 406d of the fourth embodiment has a nested structure in which a sliding cargo compartment 821d is placed inside of the cargo compartment 821, lower ends of a gate 823d are connected to the sliding cargo compartment 821d by hinges, and the gate 823d and the sliding cargo compartment 821d can be pulled out from a lower side of the top plate 824 toward the side. According to this configuration, workability is improved since the loaded contents can be pulled out together with the sliding cargo compartment 821d. Furthermore, in this embodiment, the second top plate 824b is arranged.

Movable Body (5)

Figure 19:
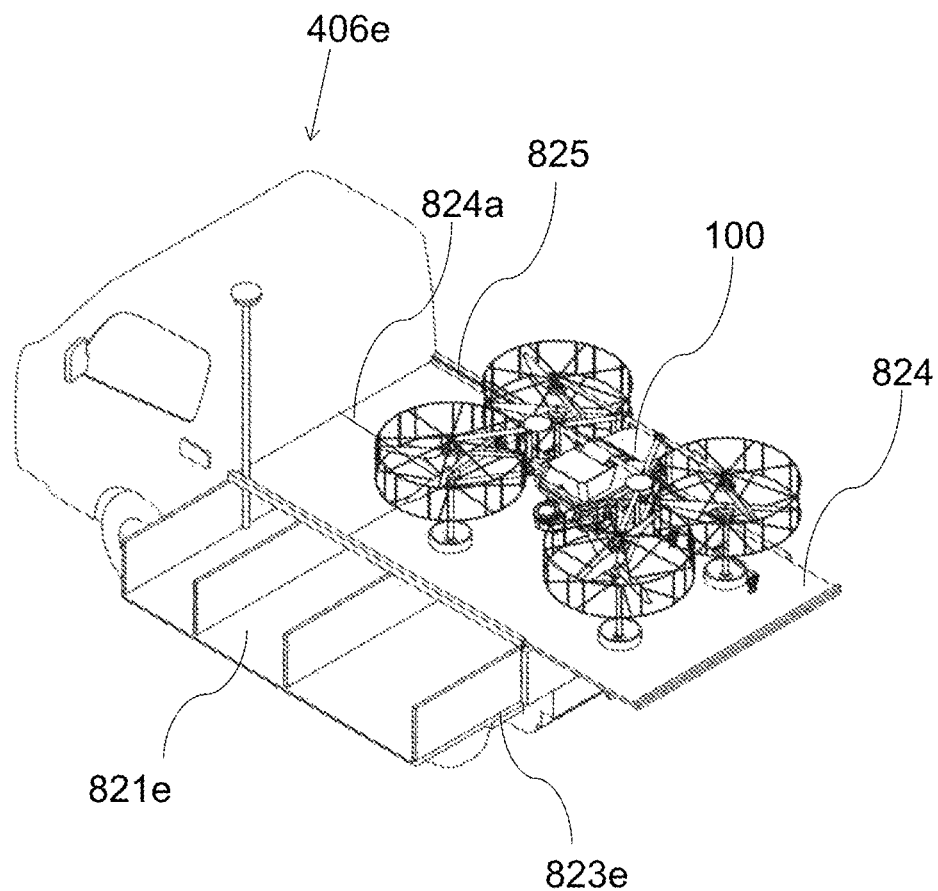
FIG. 19 is an overall conceptual diagram illustrating the fifth embodiment of the movable body according to the present invention and a state of the drone mentioned above.

The fifth embodiment of the movable body according to the present invention will be described with reference to FIG. 19 by focusing on parts different from the above described embodiment. In the movable body 406e of the fifth embodiment, a side gate 823e is connected to ends of the loading platform 82 by hinges and a sliding cargo compartment 821e can be pulled out from the cargo compartment 821. According to this configuration, since the sliding cargo compartment 821e is supported by the side gate 823e when the sliding cargo compartment 821e is pulled out, the sliding cargo compartment 821e can be pulled out more stably. In this embodiment, the second top plate 824b is arranged.

Movable Body (6)

Figure 20:
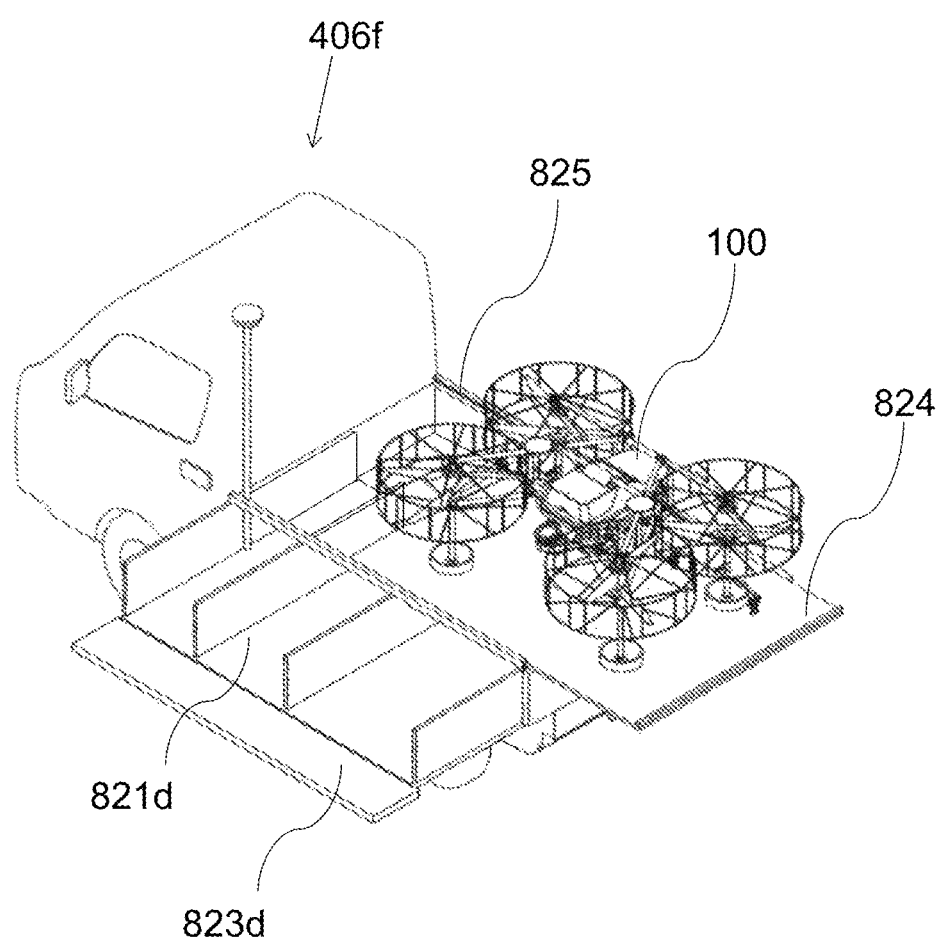
FIG. 20 is an overall conceptual diagram illustrating the sixth embodiment of the movable body according to the present invention and a state of the drone mentioned above.

A movable body 406f of the sixth embodiment illustrated in FIG. 20 has a mode that the second top plate 824b of the movable body 406d of the fourth embodiment is removed.

Movable Body (7)

Figure 21:
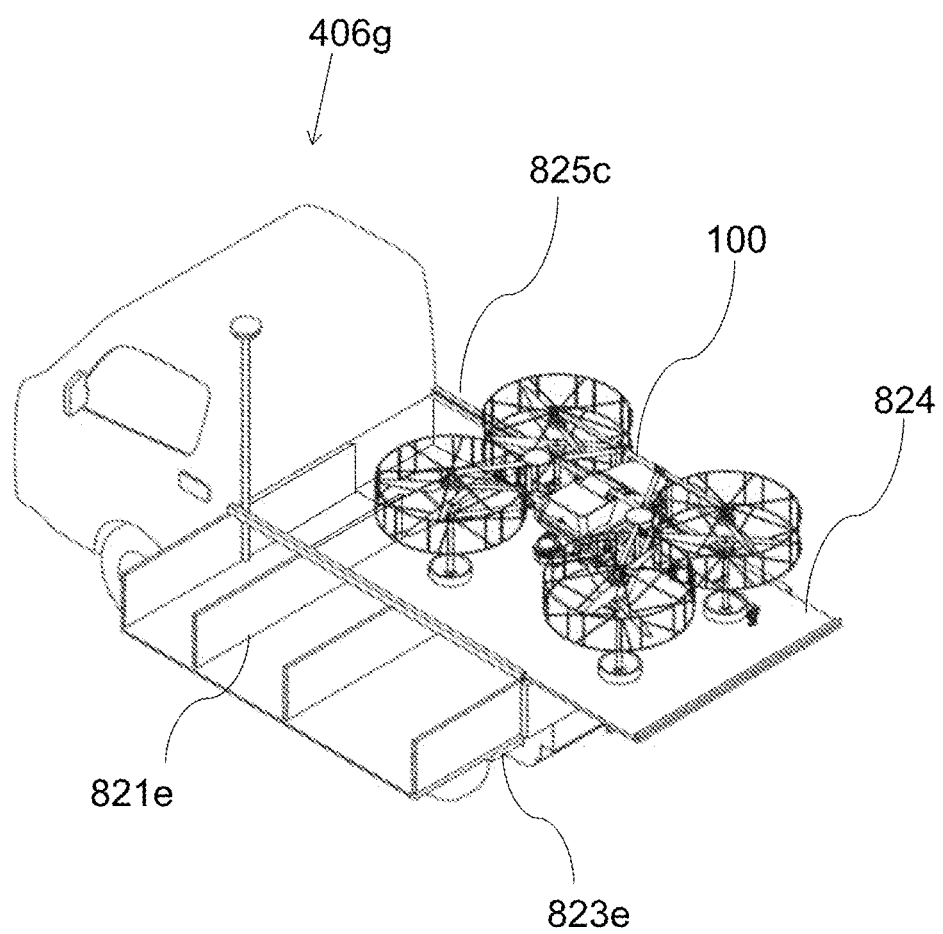
FIG. 21 is an overall conceptual diagram illustrating the seventh embodiment of the movable body according to the present invention and a state of the drone mentioned above.

A movable body 406g of the seventh embodiment illustrated in FIG. 21 has a mode that the second top plate 824b of the movable body 406e of the fifth embodiment is removed.

Movable Body (8)

Figure 22:
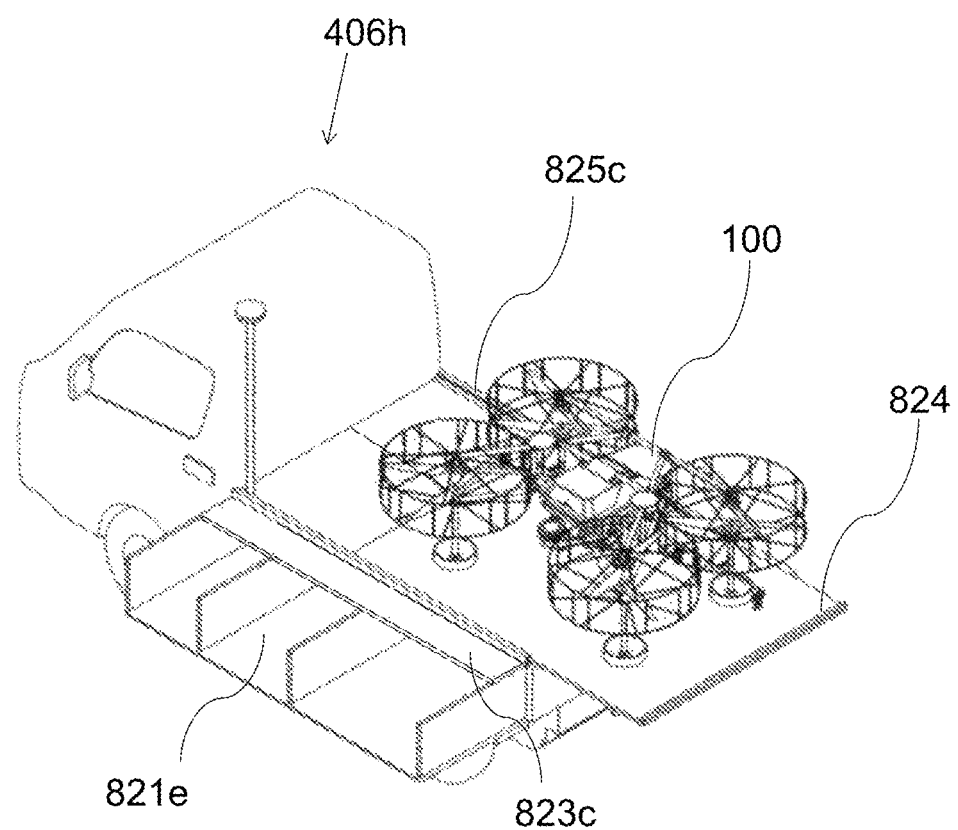
FIG. 22 is an overall conceptual diagram illustrating the eighth embodiment of the movable body according to the present invention and a state of the drone mentioned above.

A movable body 406h of the eighth embodiment illustrated in FIG. 22 is arranged with the gate 823c of the third embodiment and has a mode where the sliding cargo compartment 821*e* is pulled out from a lower part of the gate 823*c*. In this embodiment, the second top plate 824*b* is arranged.

Movable Body (9)

Figure 23:
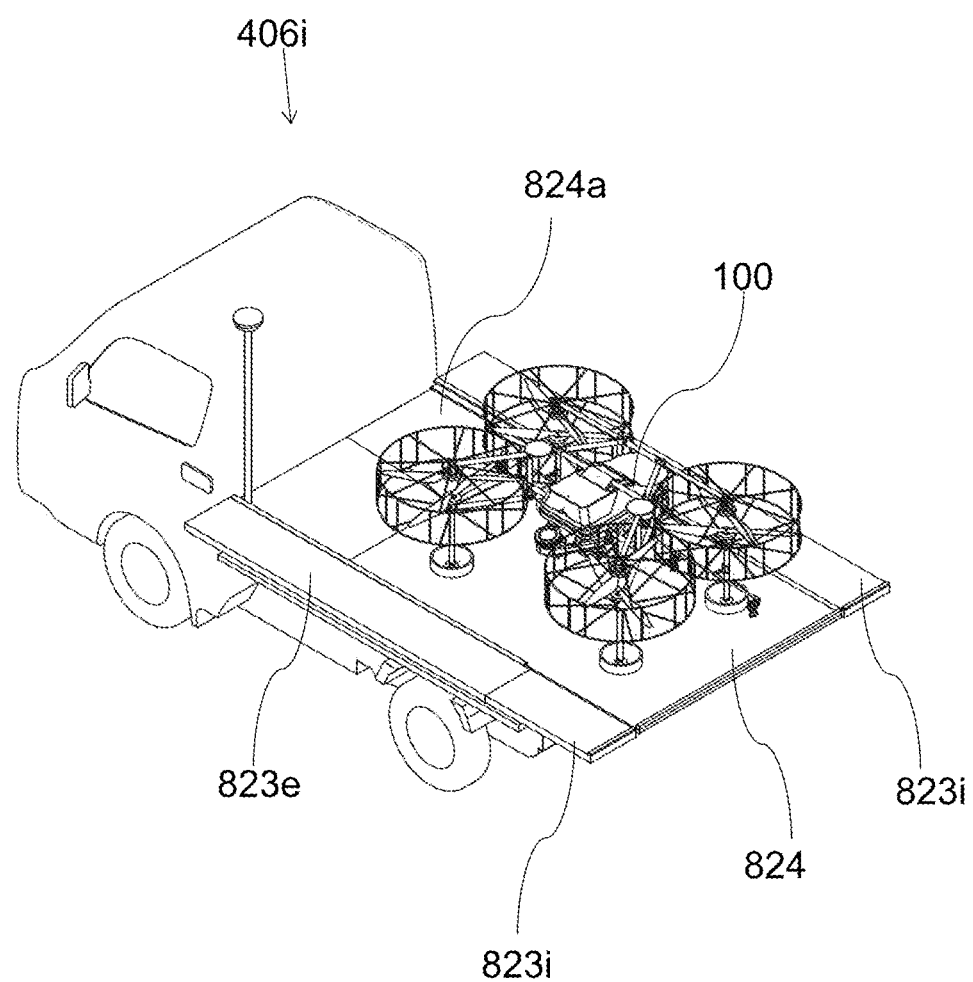
FIG. 23 is an overall conceptual diagram illustrating the ninth embodiment of the movable body according to the present invention and a state of the drone mentioned above.

A movable body 406*i* of the ninth embodiment illustrated in FIG. 23 is arranged with the gate 823*c* of the third embodiment (see FIG. 17), and extension members 823*i* extending toward rear ends in the traveling direction of the gate 823*c* are connected to the gate 823*c*. The extension member 823*i* is a flat plate having substantially same thickness as the gate 823*c*, and is connected to the gate 823*c* by a rotating mechanism, such as hinges and the like, or a sliding mechanism sliding the extension member 823*i* along the plane of the gate 823*c* at a rear end of the gate 823*c* in the travel direction. The extension member 823*i* can be fixed substantially in parallel on a substantially same plane as the top plate 824. A rear end of the extension member 823*i* is arranged up to a rear end of the movable body 406*i* while fixed on the substantially same plane as the top plate 824. A rib similar to the rear end of the top plate 824 is formed at the rear end of the extension member 823*i* to prevent the drone 100 from falling from the loading platform 82. According to this configuration, a landable surface can be expanded by the gate 823*c* and the extension member 823*i*.

The extension members 823*i* may be connected to the sides of the top plate 824 by the rotating mechanism or the sliding mechanism, sliding the extension members 823*i* along the plane of the top plate 824.

In FIG. 23, a pair of the gates 823*c* and the extension members 823*i* are arranged substantially symmetrically at left and right sides of the top plate 824, but one of the left and right sides may be arranged at a side of the top plate 824. In this configuration, it is optional whether the sliding cargo compartments 821*d* or 821*e* can be pulled out from the cargo compartment 821.

Movable Body (10)

Figure 24:
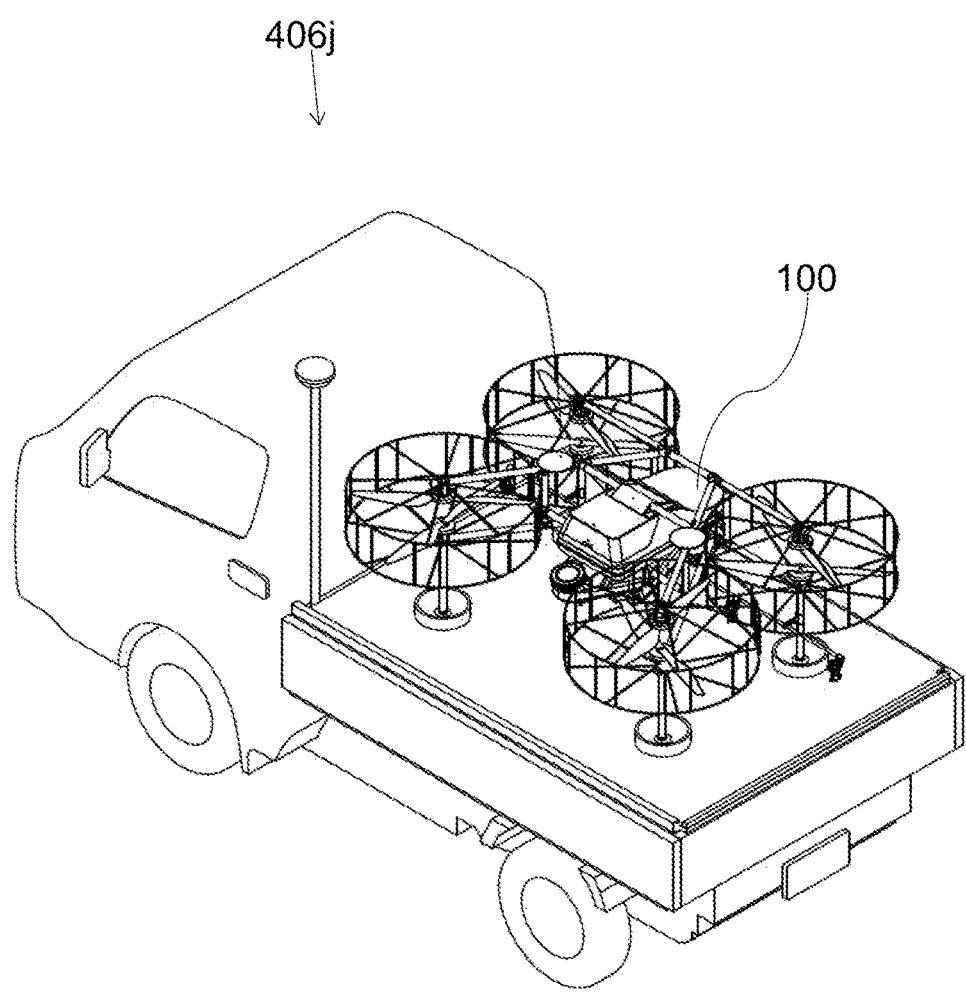
FIG. 24 is an overall conceptual diagram illustrating the tenth embodiment of the movable body according to the present invention and a state of the drone mentioned above.

The movable body 406*j* of the tenth embodiment illustrated in FIG. 24 has a configuration in which the rail 825 is not included and the top plate 824 does not slide with respect to the cargo compartment 821.

In all of the embodiments described above, it is optional whether it is symmetrical or only one of the left and right sides has the features described above. The movable body having the structures described in the embodiments that are different on the left and right sides may belong to the technical scope of the present invention.

In the present description, an agricultural chemical spraying drone has been described as an example, but the technical idea of the present invention is not limited to this, and can be applied to all drones for other purposes such as photography, surveillance, and the like. In particular, it is applicable to machines operating autonomously. The movable body may not be limited to the vehicles and may have appropriate configurations.

(Technically Significant Effects of the Invention)

In the drone system according to the present invention, the drone and the movable body, that is movable with loading the drone and where the drone can take off and land, cooperate to operate, and it is possible to maintain high level of safety even when the drone flies autonomously.

The invention claimed is:

1. A drone system comprising:
a drone; and
a movable body, which is movable with the drone mounted thereon, and where the drone can both take off from and land upon,
wherein the drone and the movable body cooperate with each other to enable the drone to take off from the movable body for a flight and return to the movable body after the flight,
wherein the drone comprises:
a flight controller controlling the flight of the drone; and
a drone transmitter transmitting information which indicates whether or not the
drone has taken off from the movable body and is in flight;
wherein the movable body comprises:
a take-off and landing area which becomes a take-off and landing point where the drone is mounted and where the drone takes off and lands;
a movement controller moving the movable body with the drone;
a movable body receiver receiving the information from the drone; and
a display unit displaying information based on the information received from the drone, and
wherein when the information which indicates that the drone has taken off from the movable body and is in flight is received by the movable body receiver, a restriction is applied to the movable body such that the movable body is either prohibited from moving or is only allowed to move within a predetermined range, and when the information which indicates that the drone is not in flight is received by the movable body receiver the restriction is not applied.

2. The drone system according to claim 1, wherein the movable body further comprises at least a mode switching mechanism capable of switching between a mode where the movable body can move and a mode where the drone can take off from and land on the movable body, and
wherein when the information indicating that the drone is in flight is received by the movable body receiver, the movable body is held in a mode where the drone can take off and land.

3. The drone system according to claim 2, wherein the movable body further comprises a mode acquisition unit capable of acquiring the mode of the movable body.

4. The drone system according to claim 2, wherein the movable body further comprises a movable body transmitter capable of transmitting the mode of the movable body to the drone, and the drone determines a landing position of the drone based on the mode of the movable body.

5. The drone system according to claim 1, wherein the drone guides the movable body to a position where the drone can take off and land.

6. The drone system according to claim 1, wherein the flight controller determines whether the drone can land at the take-off and landing point of the drone based on information of the movable body received by the drone.

7. The drone system according to claim 6,
wherein the movable body comprises a peripheral environment acquisition unit to acquire information related to a peripheral environment of the take-off and landing point, and the movable body can transmit the information related to the peripheral environment to the drone, and
wherein the drone determines whether the drone can land at the take-off and landing point based on the information related to the peripheral environment.

8. The drone system according to claim 6, wherein the flight controller acquires a position of the movable body and determines whether the drone can land at the take-off and landing point based on the position of the movable body.

9. The drone system according to claim 6, wherein the flight controller lands the drone on a ground corresponding to a point where the drone has taken off when the flight controller determines that the drone cannot land at the take-off and landing point.

10. The drone system according to claim 6, wherein the flight controller lands the drone in a target area where the drone operates when the flight controller determines that the drone cannot land at the take-off and landing point.

11. The drone system according to claim 6, wherein the flight controller stops a return of the drone and makes the drone to hover at a predetermined point when the flight controller determines that the drone cannot land at the take-off and landing point.

12. The drone system according to claim 1,
wherein the movable body further comprises:
a movement detector detecting that the movable body has been moved while the drone is in flight; and
an intervention operation unit transmitting an instruction to perform an evacuation action to the drone,
wherein the intervention operation unit transmits the instruction to perform the evacuation action to the drone when the movement detector detects that the movable body has been moved.

13. The drone system according to claim 12, wherein the intervention operation unit generates an operating route of the drone from a predetermined position in a target area where the drone operates to the take-off and landing point and transmits to the drone.

14. The drone system according to claim 1, wherein the movable body acquires a remaining amount of a battery mounted on the drone, predicts a flyable range of the drone based on the amount of the battery, and restricts a moving range of the movable body based on the flyable range.

15. The drone system according to claim 1, the system further comprising a rear display unit installing on a rear side of a body that covers a passenger seat of the movable body, or rear of the body, or a side of the body and indicating that the drone is operating.

16. The drone system according to claim 1, the system further comprising an upper display unit installed on an upper part of a body of the movable body and indicating that the drone is operating on a front side and a rear side of the body.

17. The drone system according to claim 1, wherein when the information which indicates that the drone has taken off from the movable body and is in flight is received by the movable body receiver, the restriction is applied to the movable body such that the movable body is prohibited from moving.

18. A drone system control method, comprising a drone and a movable body, which is movable with the drone mounted thereon and where the drone can both take off from and land upon, wherein the drone and the movable body cooperate with each other to enable the drone to take off from the movable body for a flight and return to the movable body after the flight;
wherein the movable body comprises a take-off and landing area which becomes a take-off and landing point where the drone is mounted and where the drone takes off and lands;
the method comprising steps of:
controlling the flight of the drone;
transmitting information which indicates whether or not the drone has taken off from the movable body and is in flight;
mounting the drone on the take-off and landing area and moving the movable body with the drone;
receiving, by the movable body, the information from the drone;
displaying information based on the information received from the drone; and
when the information received by the movable body from the drone indicates that the drone has taken off from the movable body and is in flight, applying a restriction to the movable body such that the movable body is either prohibited from moving or is only allowed to move within a predetermined range, and when the information received by the movable body from the drone indicates that the drone is not in flight the restriction is not applied.

19. A non-transitory computer-readable storage medium that stores a computer-executable program for controlling a drone system, comprising a drone and a movable body, which is both movable with the drone mounted thereon and where the drone can both take off from and land upon, wherein the drone and the movable body cooperate with each other to enable the drone to take off from the movable body for a flight and return to the movable body after the flight;
wherein the movable body comprises a take-off and landing area which becomes a take-off and landing point where the drone is mounted and where the drone takes off and lands;
the program comprising instructions for:
controlling the flight of the drone;
transmitting information which indicates whether or not the drone has taken off from the movable body and is in flight;
mounting the drone on the take-off and landing area and moving the movable body with the drone;
receiving, by the movable body, the information from the drone;
displaying information based on the information received from the drone; and
when the information received by the movable body from the drone indicates that the drone has taken off from the movable body and is in flight, applying a restriction to the movable body such that the movable body is either prohibited from moving or is only allowed to move within a predetermined range, and when the information received by the movable body from the drone indicates that the drone is not in flight the restriction is not applied.

20. A movable body movable with a drone mounted thereon and which makes is possible for the drone to both take off therefrom and land thereon, comprising:
a take-off and landing area where the drone is mounted and becomes a takeoff and landing point where the drone both takes off from and lands upon, wherein the movable body cooperates with the drone to enable the drone to take off from the movable body for a flight and return to the movable body after the flight;
a movement controller moving the movable body with the drone;
a movable body receiver receiving information from the drone which indicates whether or not the drone has taken off from the movable body and is in flight; and
a display unit displaying information based on the information received from the drone,
wherein when the information which indicates that the drone has taken off from the movable body and is in flight is received by the movable body receiver, a restriction is applied to the movable body such that the movable body is either prohibited from moving or is only allowed to move within a predetermined range, and when the information which indicates that the drone is not in flight is received by the movable body receiver the restriction is not applied.

21. A drone mounted on a movable body and capable of moving with the movable body, comprising:

a flight controller controlling a flight of the drone; and a drone transmitter transmitting information which indicates whether or not the drone has taken off from the movable body and is in flight, wherein the movable body comprises:

a take-off and landing area where the drone is mounted and becomes a takeoff and landing point where the drone both takes off from and lands upon, wherein the movable body cooperates with the drone to enable the drone to take off from the movable body for a flight and return to the movable body after the flight;

a movement controller moving the movable body with the drone;

a movable body receiver receiving information from the drone which indicates whether or not the drone has taken off from the movable body and is in flight; and a display unit displaying information based on the information received from the drone, wherein when the information which indicates that the drone has taken off from the movable body and is in flight is received by the movable body receiver, a restriction is applied to the movable body such that the movable body is either prohibited from moving or is only allowed to move within a predetermined range, and when the information which indicates that the drone is not in flight is received by the movable body receiver the restriction is not applied.

* * * * *